US008402999B2

(12) United States Patent
Nini

(10) Patent No.: US 8,402,999 B2
(45) Date of Patent: Mar. 26, 2013

(54) LIQUID DISPENSING TAP, IN PARTICULAR FOR LIQUIDS WITH HIGHER DENSITY

(75) Inventor: Diego Nini, Alessandria (IT)

(73) Assignee: Vitop Moulding S.R.L., Alessandria (IT)

( * ) Notice: Subject to any disclaimer, the term of this patent is extended or adjusted under 35 U.S.C. 154(b) by 958 days.

(21) Appl. No.: 12/294,026

(22) PCT Filed: Mar. 22, 2006

(86) PCT No.: PCT/IT2006/000179

§ 371 (c)(1), (2), (4) Date: Mar. 30, 2009

(87) PCT Pub. No.: WO2007/108025

PCT Pub. Date: Sep. 27, 2007

(65) Prior Publication Data

US 2009/0301572 A1 Dec. 10, 2009

(51) Int. Cl.
*F16K 24/00* (2006.01)

(52) U.S. Cl. .................... 137/588; 137/533.19; 222/484

(58) Field of Classification Search ............. 137/533.19, 137/588, 855, 859; 222/143, 482, 484, 485, 222/541.1; 251/89–90
See application file for complete search history.

(56) References Cited

U.S. PATENT DOCUMENTS

| | | | | |
|---|---|---|---|---|
| 200,866 | A * | 3/1878 | Lillis et al. | 222/481.5 |
| 2,702,563 | A * | 2/1955 | Snyder et al. | 137/588 |
| 2,847,043 | A * | 8/1958 | Sommers | 141/305 |
| 2,855,127 | A | 10/1958 | Lerner et al. | |
| 2,942,762 | A | 6/1960 | Fahr | |
| 3,405,848 | A * | 10/1968 | Damrel | 222/481.5 |
| 3,638,689 | A | 2/1972 | Eklund | |
| 4,100,935 | A * | 7/1978 | Harnish | 137/533.11 |
| 4,452,425 | A | 6/1984 | Lucking | |
| 4,756,335 | A | 7/1988 | Kim | |
| 4,871,096 | A * | 10/1989 | Horian | 222/487 |
| 5,254,086 | A * | 10/1993 | Palmer et al. | 604/38 |
| 5,653,258 | A * | 8/1997 | Schwarz | 137/533.19 |

(Continued)

FOREIGN PATENT DOCUMENTS

| | | | |
|---|---|---|---|
| EP | 0633195 | A1 | 1/1995 |
| EP | 1 190 985 | A2 | 3/2002 |

(Continued)

OTHER PUBLICATIONS

WO-Form PCT/ISA/210 issued in PCT/IT2006/000179, Mar. 2, 2007, Vitop Moulding S.R.L.

(Continued)

*Primary Examiner* — John K Fristoe, Jr.
*Assistant Examiner* — Time Aigbe
(74) *Attorney, Agent, or Firm* — Edwards Wildman Palmer LLP; Peter C. Lauro, Esq.; Brian R. Landry, Esq.

(57) ABSTRACT

A tap (1) is disclosed for delivering liquids, particularly for delivering high- and medium-density liquids from rigid vessels, comprising: a body (3); stem means (9); and elastic actuating means (11) of the stem 26 means (9); air inlet/outlet means (13, 25, 28) in the body (3) and inside the vessel; valve means (7) for passing air; and non-return valve means (26) placed between the air inlet and outlet means (13, 25, 28) and the vessel interior and adapted to be guided and driven by the pressure difference between outside the tap (1) and inside the vessel.

37 Claims, 26 Drawing Sheets

U.S. PATENT DOCUMENTS

| | | | | |
|---|---|---|---|---|
| 5,794,818 | A * | 8/1998 | Bromwell et al. | 222/105 |
| 6,321,948 | B1 | 11/2001 | Bellon et al. | |
| 6,401,752 | B1 * | 6/2002 | Blackbourn et al. | 137/588 |
| 7,032,783 | B1 | 4/2006 | Kamp et al. | |
| 2002/0096540 | A1 | 7/2002 | Gross et al. | |
| 2005/0155983 | A1 * | 7/2005 | Robinson et al. | 222/143 |
| 2005/0263546 | A1 | 12/2005 | Labinski et al. | |
| 2006/0201557 | A1 | 9/2006 | Shieh | |
| 2008/0257884 | A1 * | 10/2008 | Geberzahn et al. | 220/231 |

FOREIGN PATENT DOCUMENTS

| | | | |
|---|---|---|---|
| GB | 406127 | A | 2/1934 |
| GB | 886369 | A | 1/1962 |
| GB | 2 096 284 | A | 10/1982 |
| GB | 2 333 288 | A | 7/1999 |
| WO | 80/02546 | A1 | 11/1980 |
| WO | 9965798 | A1 | 12/1999 |
| WO | WO-2005/124204 | A | 12/2005 |
| WO | WO 2005124204 | A2 * | 12/2005 |
| WO | 2006097704 | A1 | 9/2006 |
| WO | 2006097724 | A2 | 9/2006 |

OTHER PUBLICATIONS

WO-Form PCT/ISA/237 issued in PCT/IT2006/000179, Mar. 2, 2007, Vitop Moulding S.R.L.

* cited by examiner

LIQUID DISPENSING TAP, IN PARTICULAR FOR LIQUIDS WITH HIGHER DENSITY

This application is the U.S. national phase, pursuant to 35 U.S.C. §371, of PCT international application Ser. No. PCT/IT2006/000179, filed Mar. 22, 2006, designating the United States and published in English on Sep. 27, 2007 as publication WO 2007/108025 A1. The entire contents of the aforementioned patent application are incorporated herein by this reference.

The present invention refers to a liquid dispensing tap, and more particularly to a dispensing tap for delivering high- and medium-density liquids (for example oil, detergent and the like) from rigid vessels.

The inventive tap finds a non-limiting application both to a vessel equipped with a dispensing hole, which operates as seat for the tap and filling hole of the vessel, and to a rigid vessel, in which two holes are generally obtained, one which is used for "housing" the liquid dispensing tap and the other which is used for filling the container: this when and if the production cycle provides first the insertion, or screwing, of the tap and then the filling of the other hole.

In these cases, for the majority of products being present on the market, the second hole (namely the one which in the production cycle will be closed by means of a "normal" tap) also operates as air inlet when using the tap (in practice the second hole is made remain on the top, when using, with respect to the tap, giving the chance to the user of being able to open it in order to make air go in and therefore in order to prevent that such vacuum is created inside the vessel, which inhibits the use of the tap itself).

In the prior art, in this first case, numerous problems occur:

- very complex and costly machines must be created for filling and inserting the plug (first the tap must be inserted, then filling must be done from the other hole, and then this latter hole must also be plugged with another plug or vice versa);
- very costly containers must be created (since they have a very complex geometry having two threaded holes, generally with different diameter size);
- the total packaging cost is high, both for assembling, and for stamping, and for filling and for creating (generally from blown parison, but also from a blown pre-form), since the product is formed of numerous parts;
- there is a scarce understanding from the consumer, since, if he does not remember to remove the second plug to compensate for the pressures, makes the system lock.

There are on the market also other delivering taps which partly solve the above-cited problems, but for the major part keeps other or create new problems.

For example, there is on the market a first tap (described in GB-A-2333288), which is derived, as regards the pressure opening system (the so-called "press tap"), from the first tap introduced on the market (described in U.S. Pat. No. 4,452,425) to which an integrated air passage has been added.

There are many problems and they are due to the fact that the plug is coincident or adjacent with the liquid outlet. The fact that air intake and liquid outlet are coincident or adjacent and not well separated, makes it possible that a "choking" effect occurs for the air passage: in fact, by moving along the body and stem cylinder surface, generates friction which tends to slow it down. The resistance to fluid movement is applied however only to fluid particles immediately in contact with the surfaces. Therefore, the fluid will tend to adhere to the surfaces themselves, generating the famous possible "choking" of the air passage. Therefore, summarising, at least in its vertical version, the air passage could badly operate; it is further not excluded that such malfunction occurs also in the "horizontal" version, and above all when there are high- and medium-density liquids.

There is also another type of dispensing tap, which has the integrated air passage, and which is used with rigid vessels, which contain high- and medium-density liquids. Such tap is described in WO-A-2005124204. This dispensing tap, as an average, operates well, but it has the following defects:

- it has numerous parts (nine or ten), and namely cap, body, four or five O-rings, a driving member, a metal spring and a bell, many of which (such as spring and O-rings) are accessories: therefore, it is a very costly tap both when assembling, and when stamping;
- the metal spring sometimes (above all when the detergent has not correctly operated as lubricant) is not able to counteract the friction force of O-rings inside the tap body, and therefore the tap does not perfectly close, generating liquid leakages;
- O-rings are fragile and therefore are damaged shortly after their use;
- if FIG. 3 in patent WO-A-2005124204 is taken into account, where the tap opening position is pointed out, another serious problem can be noted: if for some reason a pressure is applied to the vessel (but sometimes there are also small leakages, even if no pressure is applied) which determines a pressure increase (and therefore a pressure difference between vessel exterior and interior), liquid will tend to leak out, in addition to the liquid outlet hole, also from the air inlet hole, flooding the internal chamber created in the driving member (which is also the spring seat). The liquid, once having filled-in the chamber, will overflow outside the tap. Having a pin which goes back towards the tap interior (when the tap is opened for making detergent go out), it is possible to plug the liquid outlet hole, when the tap is in its opening position, making liquid go out from the air hole (without applying any pressure on the vessel), which in turn, as mentioned above, after having filled-in the driving member chamber, will overflow outside the plug;
- accessories of the O-ring and metal spring type make the tap difficult to be introduced, at the end of its working life, in a plastic material recycling cycle, since it would be necessary first of all to remove everything which is not plastic, for example the spring: unfortunately, in order to remove the spring, it is necessary to disassemble the whole tap, with a loss of time and money and with an unthinkable operation in a recycling cycle with industrial amounts;
- in such taps, it can also happen, above all when there are medium- and high-density liquids, that liquid is dried on the air passage and clogs it. Especially in this type of taps, it has been possible to observe that, when the tap is closed in the hollow space included between the two O-rings which have a hole in their center, so that when the tap is opening it communicates the vessel interior with the exterior, there remains a liquid product which can be dried and can create a solid film which clogs the communication hole with the outside (present on the driving member) and in this case the tap does not correctly operate any more and flow is blocked.

For both above mentioned taps, there is no chance to be connected to a system (connector) which is used to keep the tap always open, since both taps are not provided on the air passage of a non-return valve, which prevents liquid from going out when the tap is in its opening position, due to the connector. The outlet hole is linked to a device (connector) which in turn can be connected to a pump, which drives the flow: therefore, it can happen that the tap is in an opening position but does not deliver liquid from the liquid passage, since the pump, and consequently the automatic system to which it is connected, does not require it, and therefore, without a safety valve on the air passage, liquid would go out without remedy from such passage.

Other prior taps, as mentioned above, are problematic since, not having integrated air passages, need two opposite mouths (on one the tap will be placed, and on the other a normal plug). Upon their use, the mouth opposite to the tap will be opened to make air enter into the vessel and to make no pressure differences occur between vessel exterior and interior, which would cause the flow lock from the tap. All this system (assembling, stamping and filling) is very costly.

Other prior art valve system arrangements are as follows:

GB-A-406127, in which a closing ball is provided, kept in position by a spring, differently from the innovative solution described below, in which the ball is self-driven depending on pressure difference, being the ball itself very light-weight (made for example of polystyrene (PS)) and therefore with the chance of having a very sensitive valve to even minimum pressure variations;

GB-A-886369, which exploits the weight of a bigger ball and gravity to obtain its closure;

EP-A-0633195, which exploits gravity and vessel inclination to perform its closure.

Object of the present invention is solving the above mentioned problems, by providing a dispensing tap for liquid which is equipped with an integrated air passage and a safety valve, which is self-driven and self-controlled by pressure; such tap is especially adapted for rigid vessels, which preferably contain medium- and high-viscosity liquids.

A further object of the present invention is providing a tap as mentioned above which is adapted, with suitable and trivial modifications, for all types of vessels, also for example the so-called “Bag-In-Box”, which do not need air passages, which would therefore be removed. The inventive tap is adapted to be used, optionally, with a tap covering bell, which is also used to make the vessel+tap system “regular”, which otherwise would have an irregular geometry, and therefore would be difficult to store.

The above and other objects and advantages of the invention, as will appear from the following description, are obtained by a liquid dispensing tap as claimed in claim 1. Preferred embodiments and non-trivial variations of the present invention are claimed in the dependent claims.

The present invention will be better described by some preferred embodiments thereof, provided as a non-limiting example, with reference to the enclosed drawings, in which.

Figure 1:
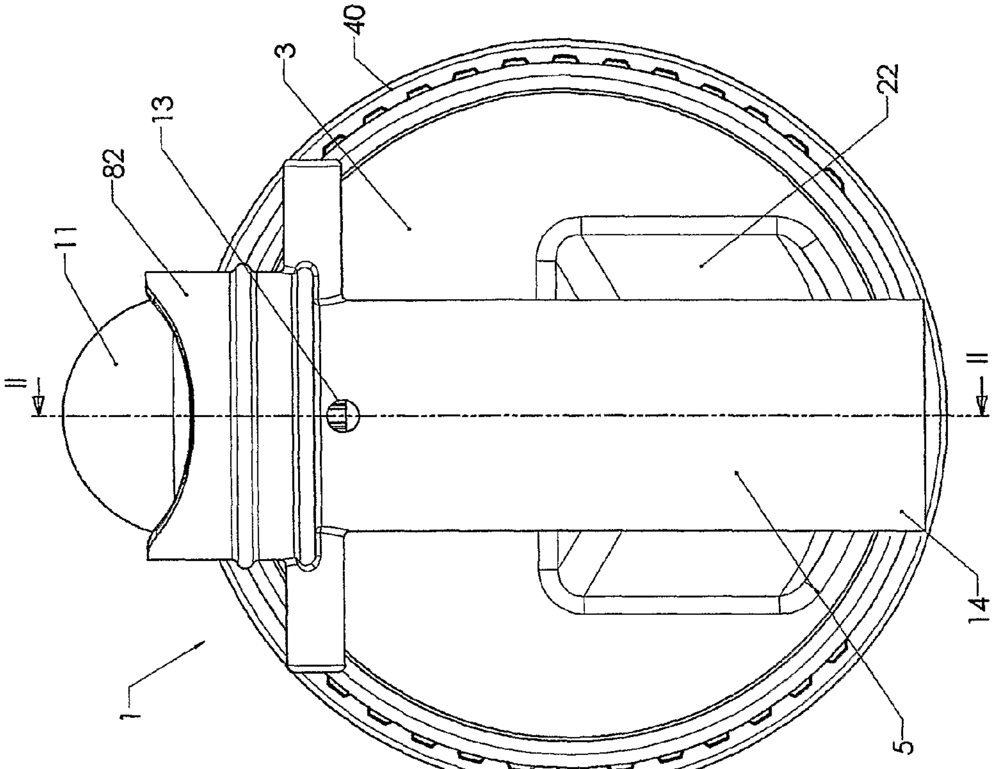
FIG. 1 is a front view of a preferred embodiment of the dispensing tap of the present invention in its closing position.
Figure 2:
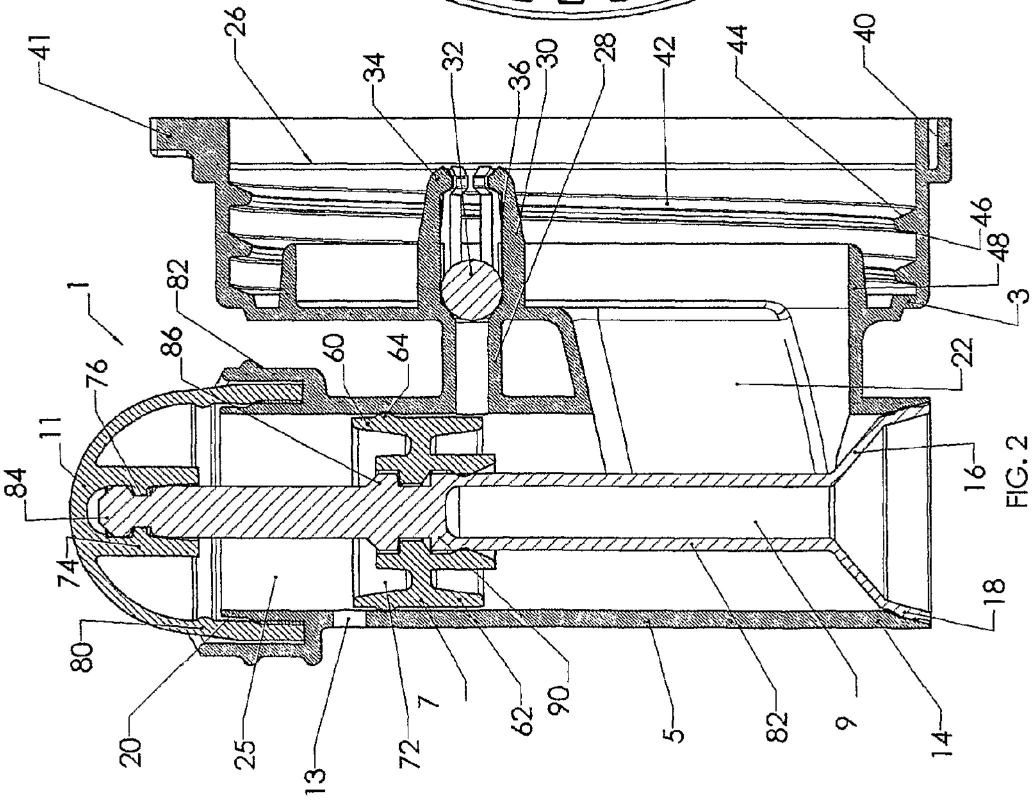
FIG. 2 is a sectional view performed along line II-II in FIG. 1.
Figure 3:
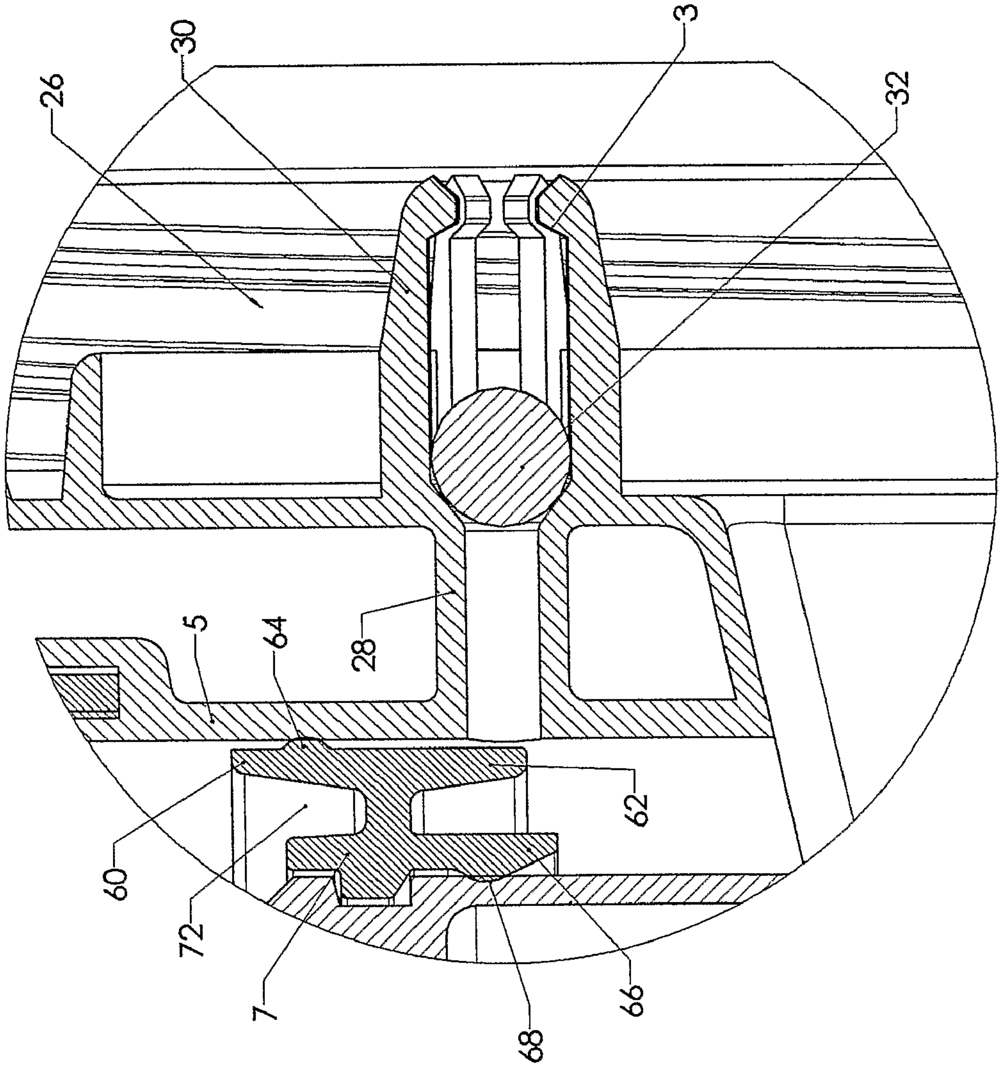
FIG. 3 is a detailed view of the valve part of the tap in FIG. 2.
Figure 4:
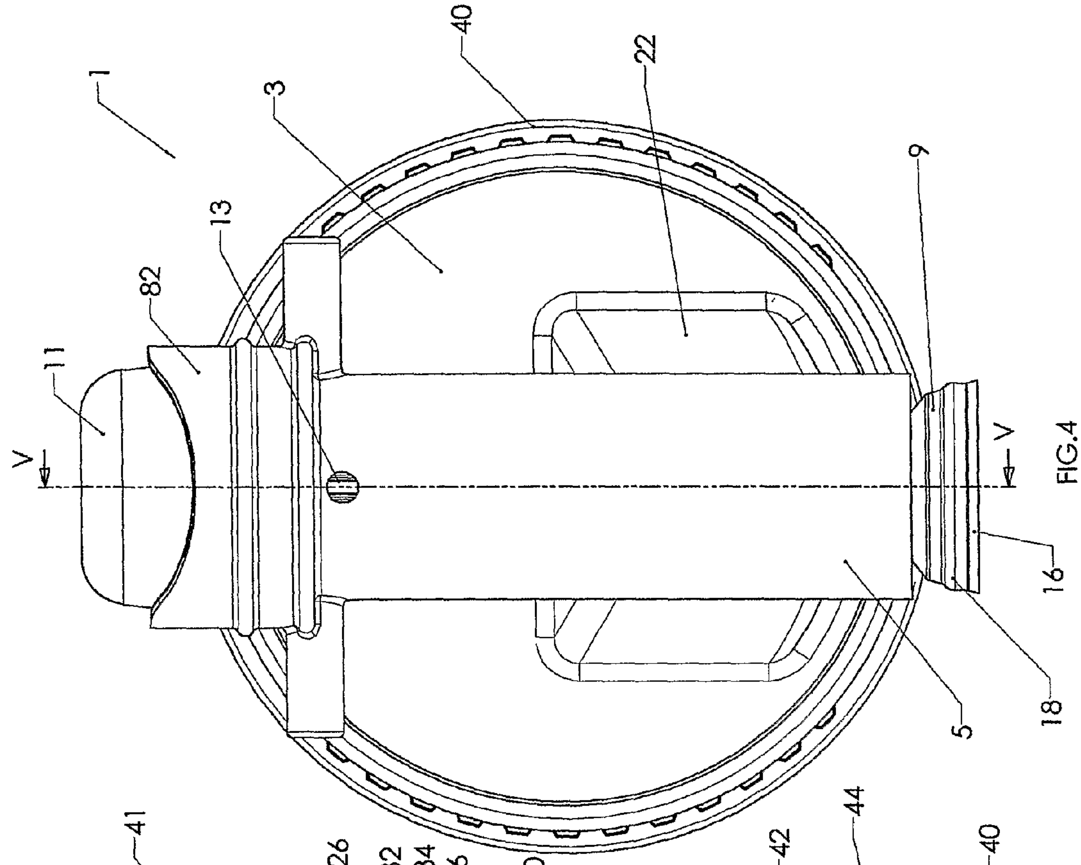
FIG. 4 is a front view of the tap in FIG. 1 in a partially opened position.
Figure 5:
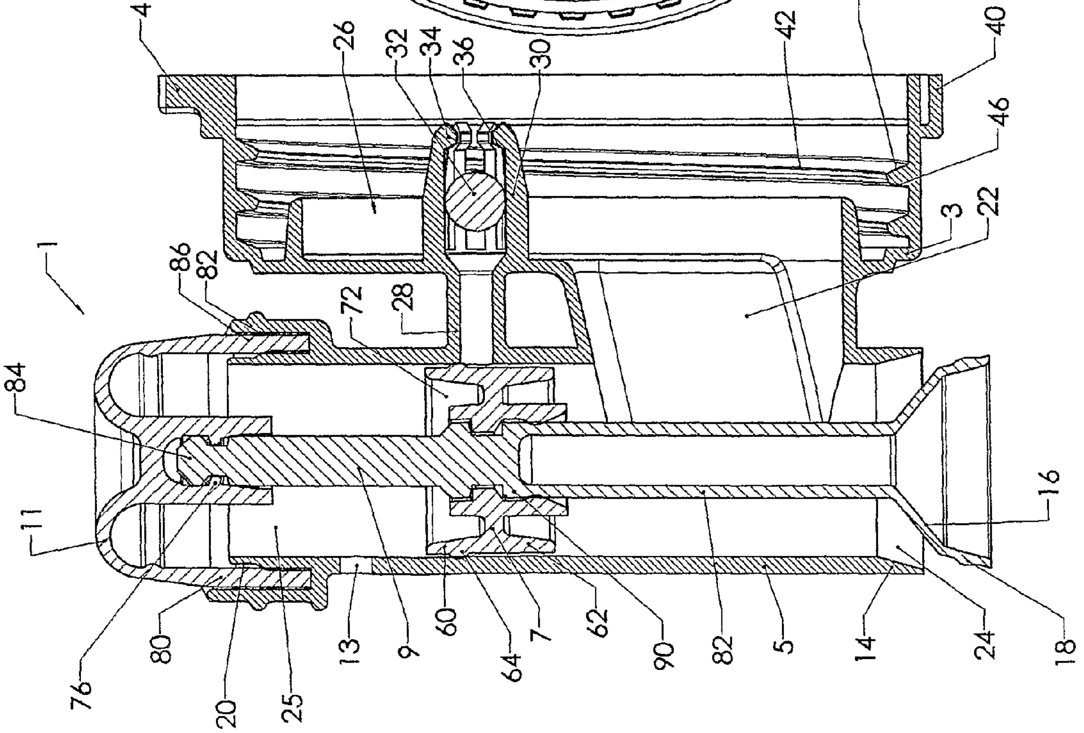
FIG. 5 is a sectional view performed along line V-V in FIG. 4.

With reference to the Figures, a preferred embodiment of the liquid dispensing tap of the present invention will be shown and described below. It will be immediately obvious to the skilled people in the art that numerous variations and modifications (for example related to shape, sizes and parts with equivalent functionality) can be realised for the described tap, without departing from the scope of the invention, as defined by the enclosed claims.

With reference to the Figures, a preferred embodiment of the dispensing tap 1 for liquids of the present invention is described, in its vertical application. It will be immediately evident that the inventive tap 1 can also be realised in its horizontal version, with minimum updates, which are evident for a common technician in the field.

The tap 1 first of all comprises a body 3, having the following main features:

a. it is made in a single piece made of plastic material, on which a front cylinder 5 is obtained, where a sealing valve 7 slides, which is joined to the moving stem 9, which in turn is joined to the upper spring member 11;
b. on the front part of the body 3, the air inlet hole 13, or similar variations, is obtained;
c. the lower part 14 of the body 3 is internally shaped with an outline which is preferably with a slanted wall, which will allow the lower part of the stem 9 (whose lower part 16 is made with a self-centring frustum-of-cone geometry) to be coupled and perform the liquid seal.

Figure 19:
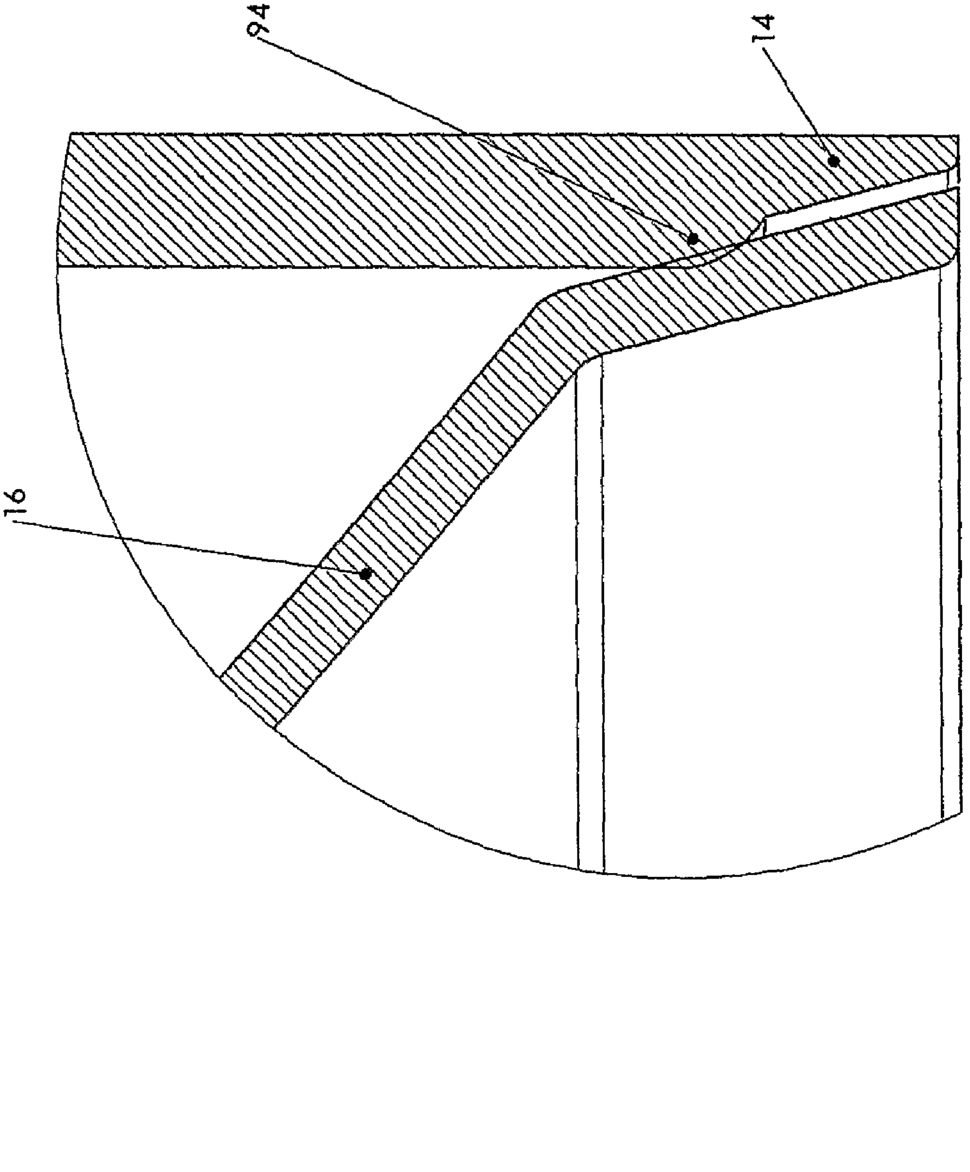
FIG. 19 is a detailed view of the seal between stem and body tap of FIG. 1.
Figure 21:
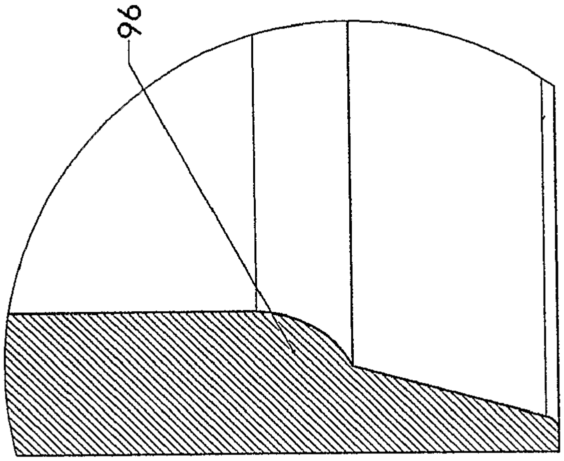
FIG. 21 is a detailed view of the coupling area between stem and tap body in FIG. 20.
Figure 20:
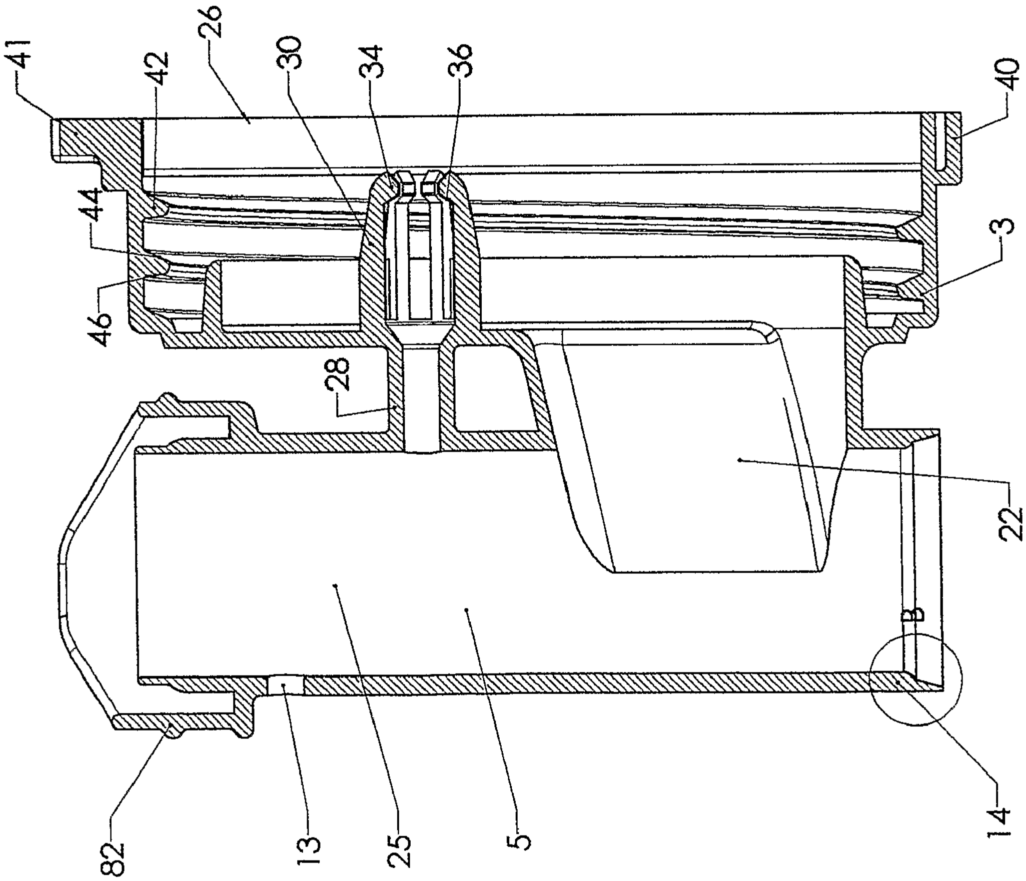
FIG. 20 is a sectional view of a variation of the inventive tap body.
Figure 23:
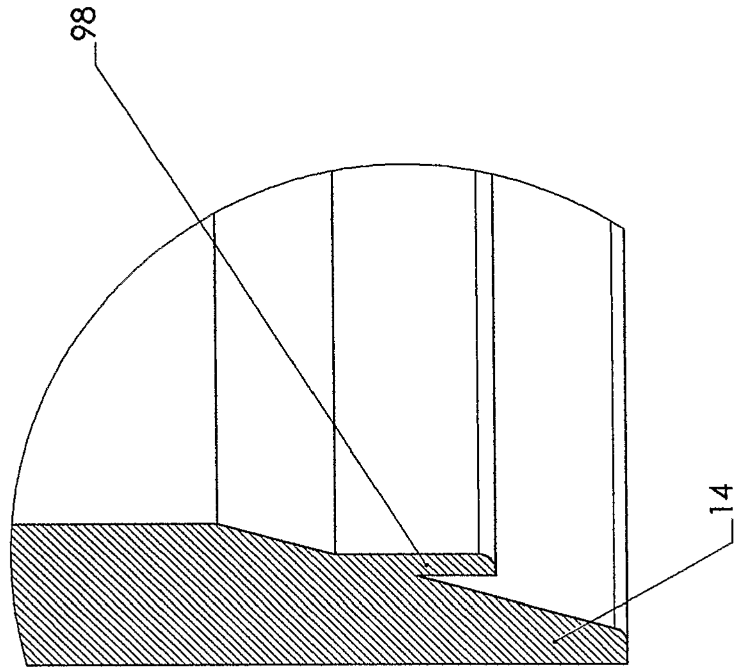
FIG. 23 is a detailed view of the coupling area between stem and tap body of FIG. 22.
Figure 22:
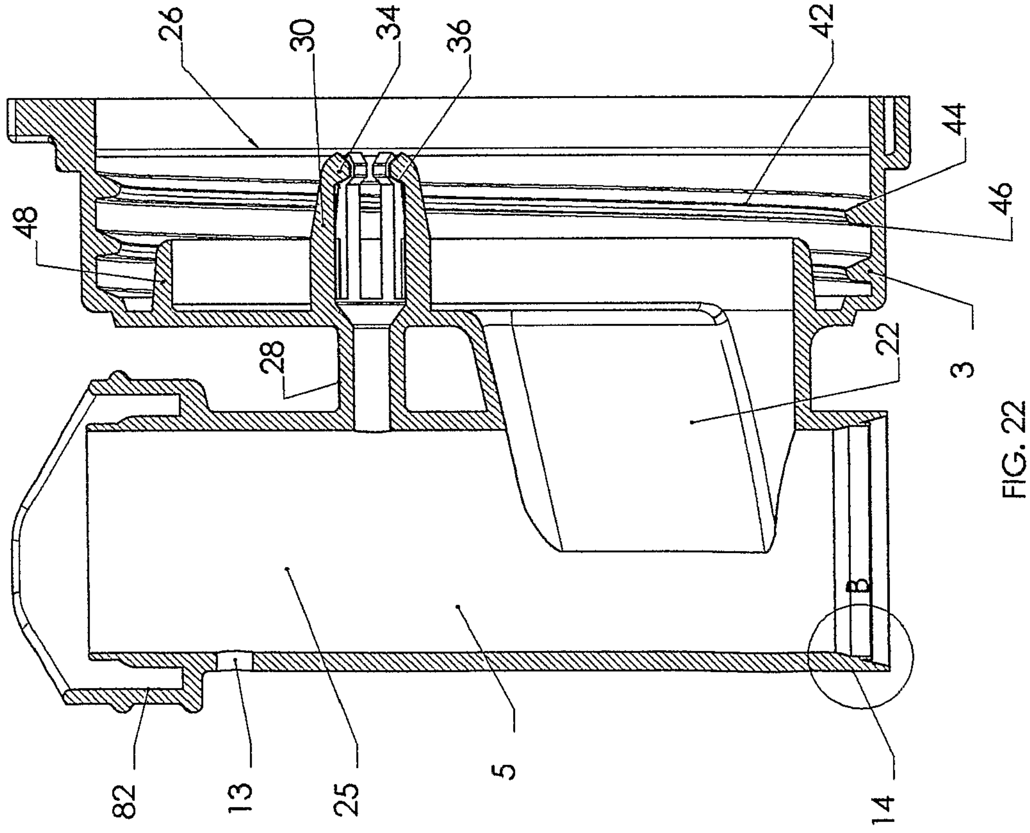
FIG. 22 is a sectional view of another variation of the inventive tap body.
Figure 24:
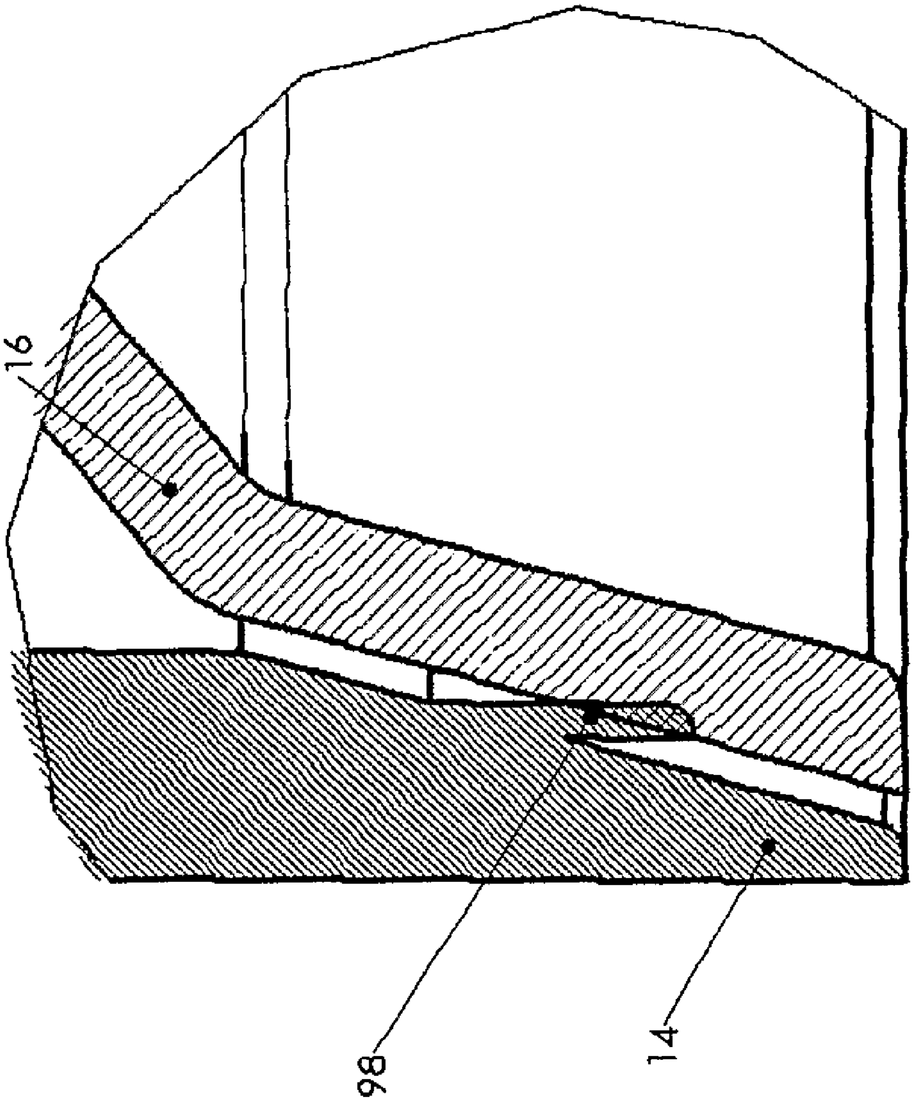
FIG. 24 is a detailed view of the coupling area between stem and tap body in FIG. 22, with the stem being present.
Figures 25, 26, 27:
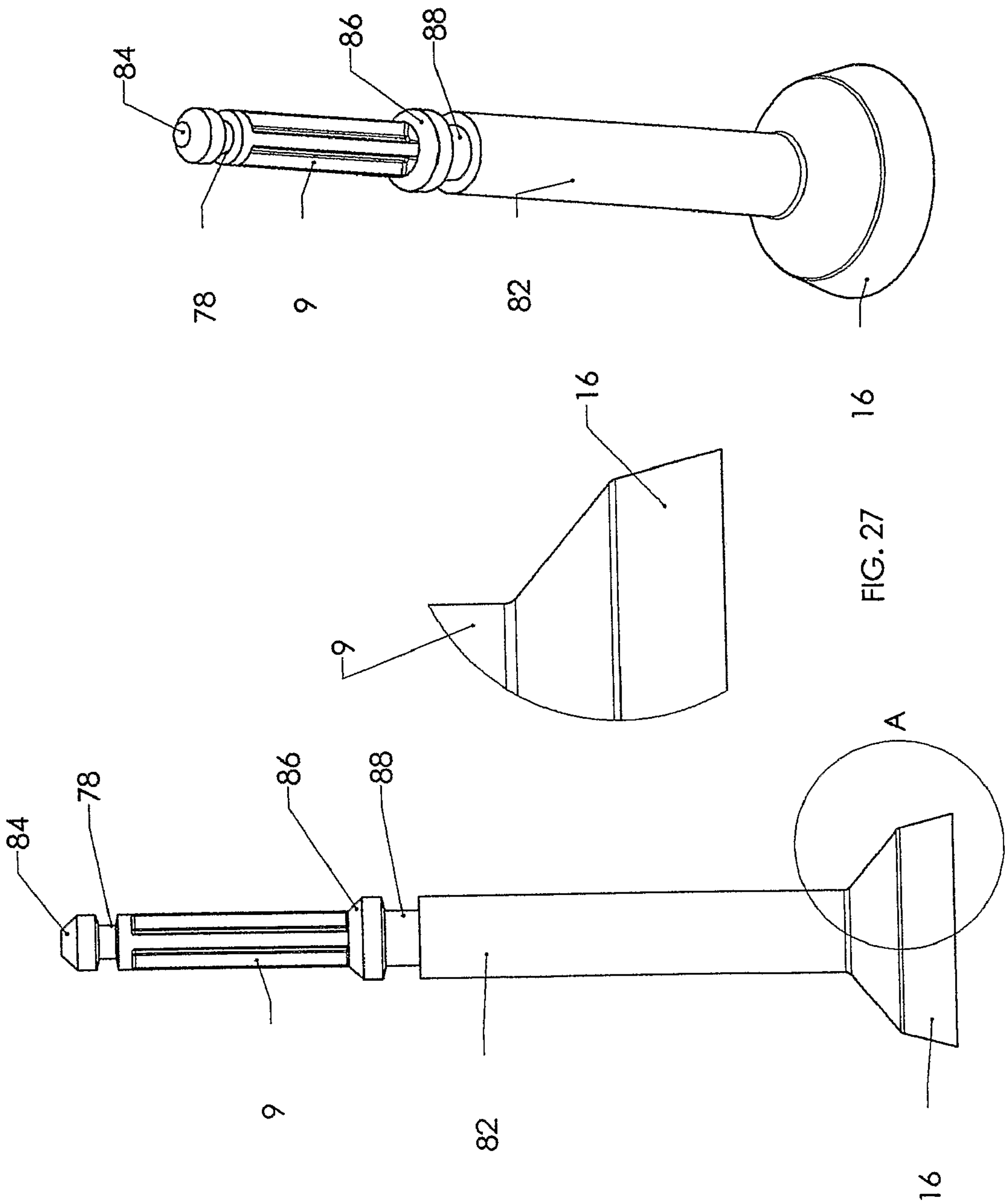
FIG. 25 is a perspective view of a variation of the inventive tap stem.
FIG. 26 is a front view of the stem in FIG. 25.
FIG. 27 is a detailed view of part of the stem in FIG. 26.

As regards still item c, FIGS. 19, 21 and 23 show three possible profiles of the body 3, adapted to realise coupling and sealing with the lower part 16 of the stem 9: particularly, FIG. 19 shows the case in which the external surface of the lower part 16 is smooth and seals the circular protuberance 94 with which the lower part 14 (in the drawings) of the body 3 is internally equipped, FIG. 21 shows the case in which inside the lower part 14 another coupling protuberance 96 is obtained, and FIG. 23 shows the case in which the lower part 14 is internally equipped with a small lip 98 which will be coupled with the external smooth surface of the lower part 16 of the stem 9, which will have a specific inclination so that the small lip best cooperates with the stem and performs a perfect coupling, possibly "compensating" for possible lacks of centring or imperfections of the stem (as can be better seen in FIG. 24).

Instead, FIG. 25 to 27 and 28 to 33 show, among the others, two possible different profiles of the lower part 16 of the stem 9: the two profiles are respectively smooth (FIG. 25 to 27) and of a ball type (FIG. 28 to 33), this latter one made so that it forms an external concentric protuberance 18 which will engage the internal smooth wall of the cylindrical part 5 of the body 3. It is also possible to create another alternative, namely a flexible small lip similar to the geometry in FIG. 23, but placed on the stem wall: obviously, in this case, it will be necessary to have the smooth wall on the body (not shown).

On the upper part of the sliding cylinder 5 of the valve 7, namely the part where the dome-shaped member 11 which mainly operates as return spring will be engaged, there is a small lip 20 which will be mechanically bent (or bent on a die or an assembling machine) in order to create a starting point for assembling the internal sealing valve 7, which otherwise would be damaged on the sharp edge being created when stamping. In fact, by bending the small lip 20, the sharp edge moves towards the outside and does not need the sealing geometry of the internal valve 7 (creating a sort of starting point for assembling). As an alternative, by modifying the pressing system, small lip 20 and riveting with rounded geometry could be removed, but the die would become more complex and costly and therefore this is not the preferred solution, even if it is technically possible.

Figure 13:
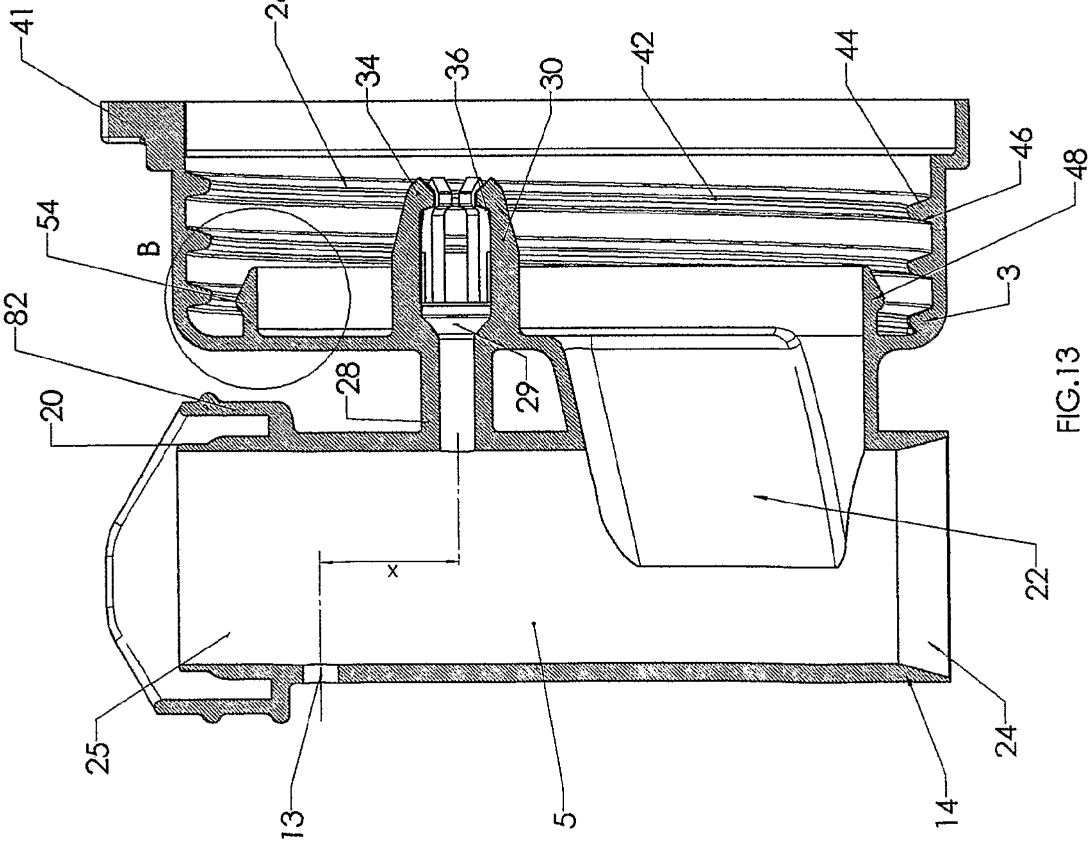
FIG. 13 is a sectional view of the inventive tap, which shows a variation of the connecting part to a vessel.

Always with reference to the body 3 of the inventive tap 1, by examining now the threaded area, which is adapted to be coupled with the vessel (not shown) containing liquid to be delivered, it is possible to see the area of the two channels for liquid and for air: they are suitably geometrically structured in order to give an absolute prevalence to the liquid outlet, since the liquid passage 22 is realised as big as possible, and is preferably equipped with slanted walls to make liquid conveyance easier. The air duct position depends on the position of the front air hole 13 and on the geometry of the chosen valve 7, as will be seen below. The height X (shown only in FIG. 13 simply in order not to complicate all other figures in which it can be found) will allow obtaining an opening delay of the air hole 13 with respect to the lower part 14 for delivering liquid in order to create a liquid prevalence and a vacuum inside the vessel which will correctly operate a liquid non-return safety valve 26, which is one of the main characteristics of the present invention. The other main characteristic is the delayed opening of the tap, which will allow the tap itself, due to vacuum, to correctly operate even without the ball-type safety valve.

The non-return safety valve 26 is placed downstream of the air duct 28 with respect to the air entry direction inside the vessel body. The duct 28 communicates with the air chamber 25 placed inside the cylinder 5 of the body 3 and which is equipped with the hole 13. The duct 28 ends with a conical profile 29 in order to realise a seal with the ball 32 of which the non-return valve 26 is composed. Such valve 26 is further substantially composed of a plurality of small teeth 30 made of a particular geometry, namely a chamfered end 34 which makes it easy on one hand to insert the ball 32 inside the small teeth (which are a sort of cage inside which the ball 32 is placed so that it can be moved from an opening to a closing position of the air flow). In the chamfered end 34, a stop edge 36 is further provided, which is adapted to keep the ball 32 between the small teeth 30, once having inserted therein the ball 32 itself. As final practical embodiment, the small teeth 30 can be made of an elastic material in order to insert therein the ball 32 at the end of manufacturing the non-return valve 26, or, as variation, the small teeth 30 can be realised as straight small teeth, which then, in order to block the ball 32, are hot riveted or mechanically bent. It is the shaping (shape) of the small teeth 30, together with the use of an adequate plastic material, which determines the resiliency of the small teeth 30 themselves.

In the Figures, the small teeth 30 are always made with a horizontal geometry, but it is clear that, with a particular stamping process, a slanted seat (not shown) could be obtained for the non-return valve 26, which would advantageously allow having, in a rest position, always the ball 32 in a closing position against the conical sealing geometry 29 obtained on the body 3.

The shown non-return valve 26, in its embodiment with a cage of small teeth 30, which are flexible or not, and with the ball 32 could also be realised in a separate piece and adapted to other existing taps on the market.

The ball 32 can be replaced, with suitable adaptations of a general geometry of the various pieces, with a stem (better shown in FIG. 45) or other pieces, which allow the system to operate as a valve. It must further be provided to give an abutment to the ball 32 with the addition of a piece which will be engaged on the body, next to the air channel through geometric adaptations (not shown). As shown below, equivalent embodiments are possible as a variation, in which the ball 32 is replaced by a mushroom 31 and by a membrane (not shown).

The peculiarity of such non-return valve 26 is that it is self-driven by the pressure, self-guided by the small teeth profile and self-lubricated by the liquid (such lubrication is also provided when stamping, adding to the plastic material a sliding agent which will make sliding easier): in fact, it will usually act, once having created vacuum inside the vessel with respect to the outside, by going back and freeing the hole (in this case the outside air will also enter inside the vessel); such valve 26 will also operate in reverse, namely in case of pressure inside the vessel, it will make the ball 32, self-guided by the small teeth, impact onto the conical profile and immediately close the air duct, avoiding to flood the upper area of the tap 1 (air zone), but conveying all pressurised liquid to the liquid outlet.

The body 3 of the tap 1 thereby has a part 40 which will contact the liquid vessel, and which must realise a perfect seal with the vessel itself. On such part 40, at least one reference member 41 is made, which determines the correct position of the tap 1 on the vessel, cooperating with similar reference members placed on the vessel itself.

As regards the securing and placing process between vessel and tap, but not of seal between liquids, the part 40 can be made of various shapes, some non-limiting ones of which are shown in the enclosed drawings. In general, the threading can simply be created by a thread 42 with the support of two geometries 44 and 46, which cooperate with other geometries (not shown) which are present on the vessel neck and make the tap stop in the right position.

Figure 16:
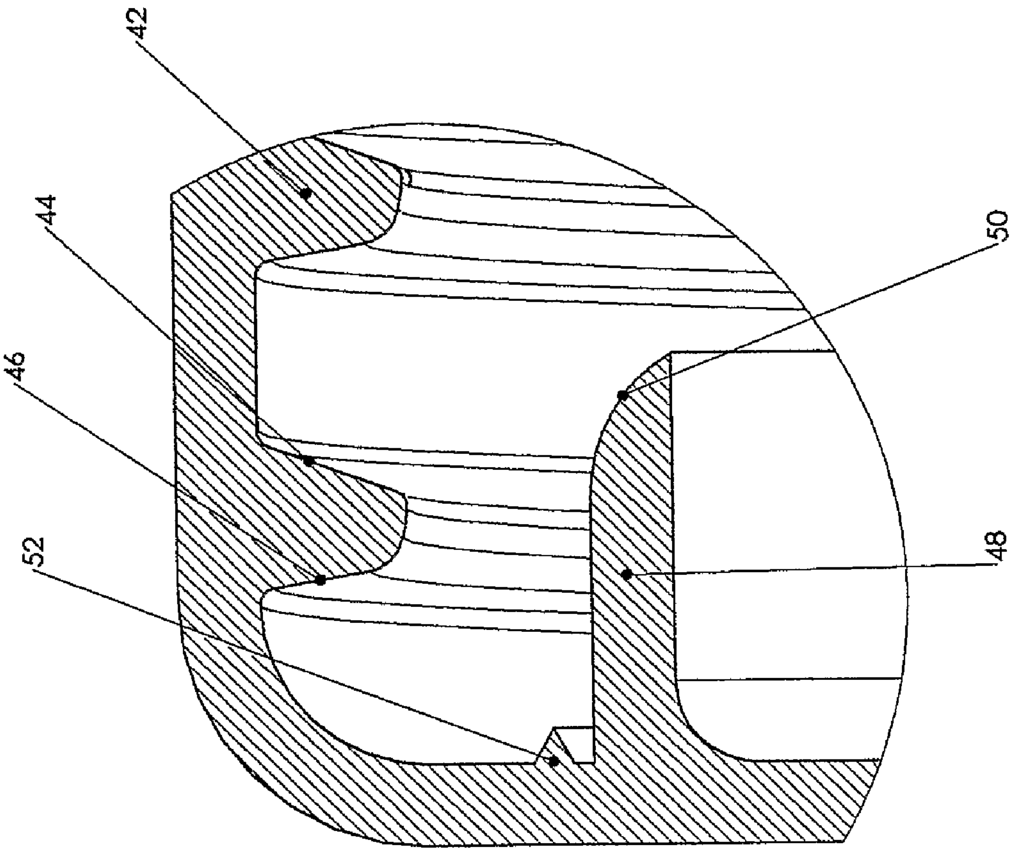
FIG. 16 is a detailed view of a further variation of the connection part of the inventive tap.

As regards instead the liquid seals between tap and vessel, in addition, further sealing options can be realised. Particularly, as can be seen in FIGS. 1 to 8 and in detail in FIG. 16, an internal sealing cylinder 48 equipped with a starting surface 50 can be provided, in which the sealing cylinder 48 also cooperates with at least one triangular concentric projection 52: in this embodiment, the cylinder 48 engages the vessel neck and the projection 52 pushes on the vessel neck nose.

Figure 14:
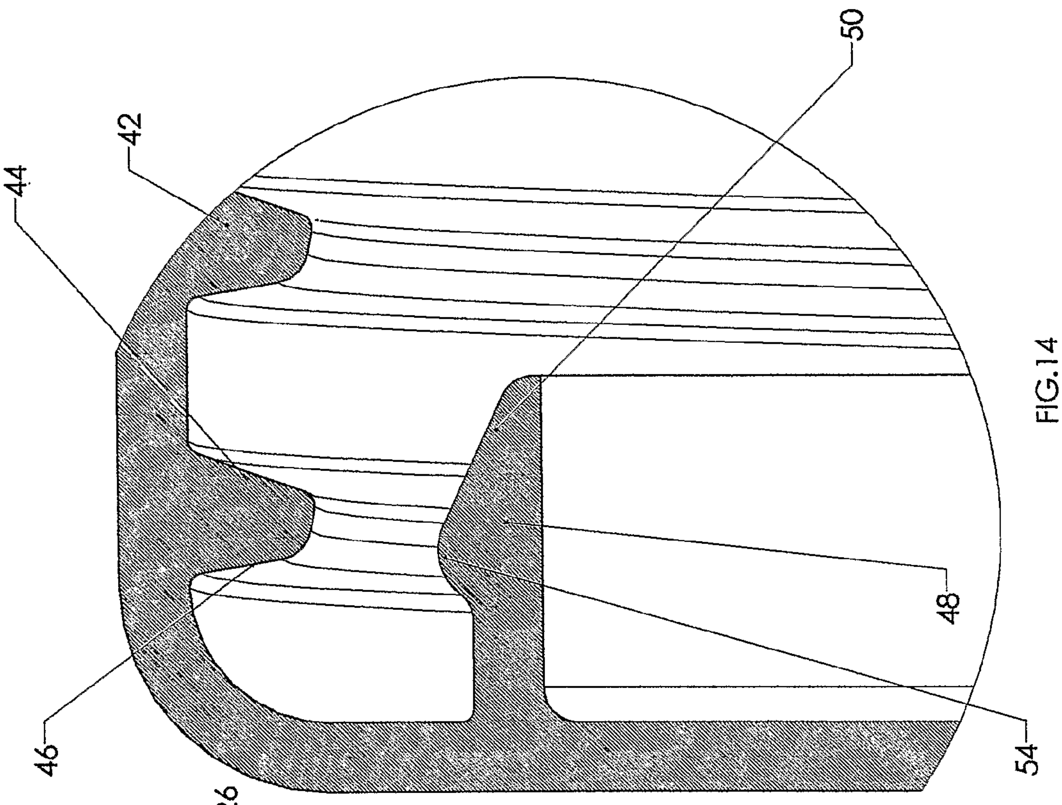
FIG. 14 is a detailed view of the connecting part of FIG. 13.

Alternatively, as shown in FIG. 14, the sealing cylinder 48 can be equipped with a sealing protuberance 54 and can be geometrically shaped in such a way as to flex in contact with the vessel body and to be automatically adapted to possible size differences from vessel to vessel.

Figure 15:
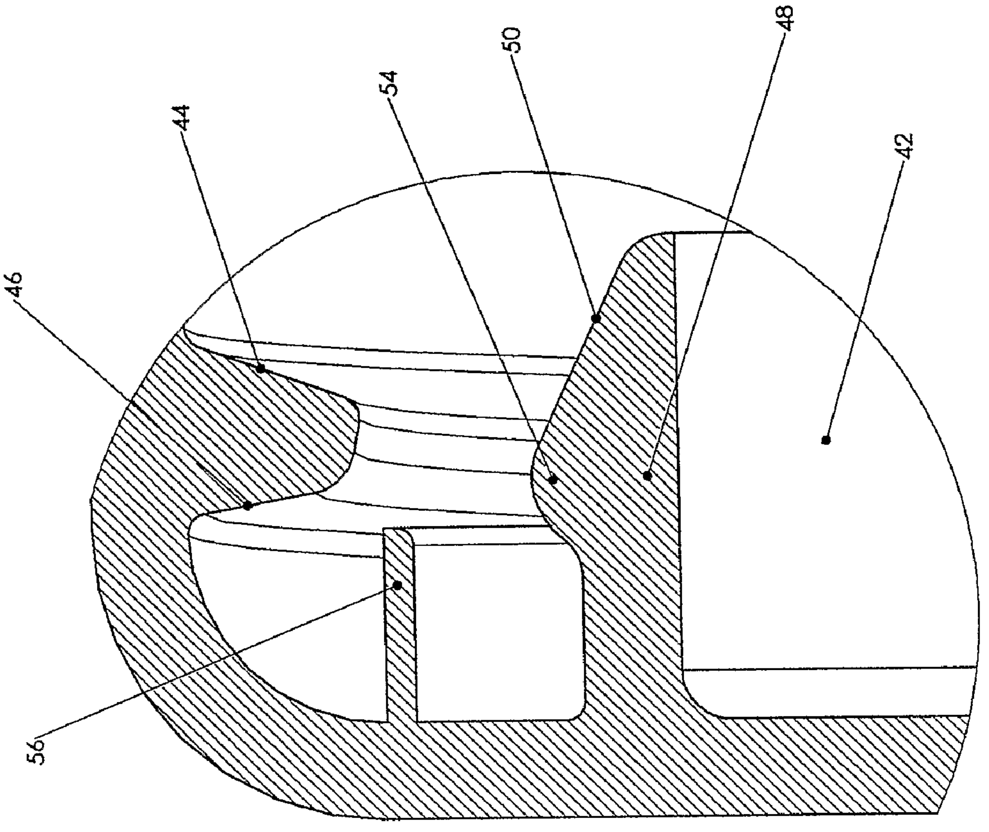
FIG. 15 is a detailed view of another variation of the connecting part of the inventive tap.

Further alternatively, as shown in FIG. 15, the configuration of FIG. 14 can be associated with a thin small lip 56, which fits to the vessel neck inside, increasing thereby the seal.

Figure 18:
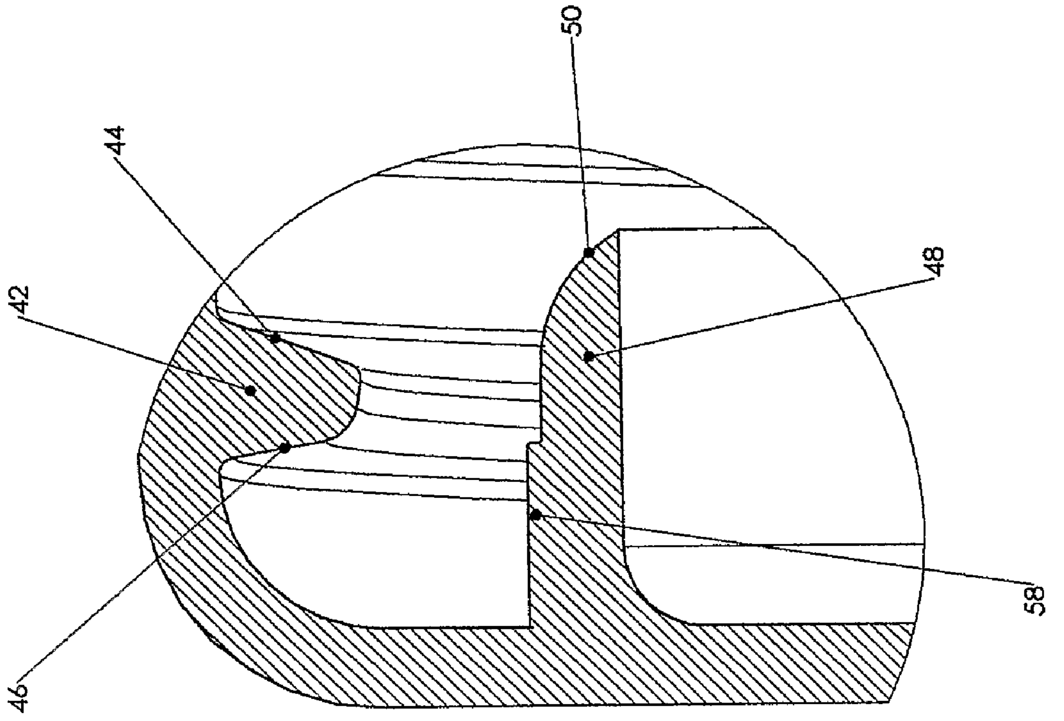
FIG. 18 is a detailed view of the connecting part of FIG. 17.
Figure 17:
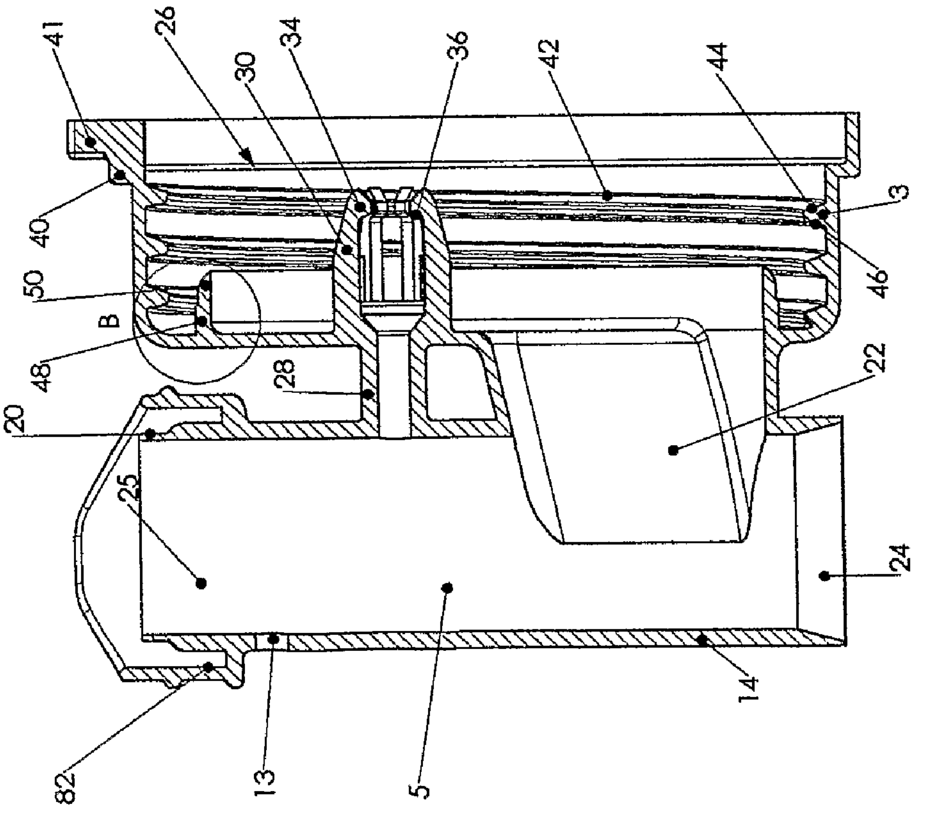
FIG. 17 is a sectional view of the inventive tap, which shows another variation of the connecting part to a vessel.

As further alternative, as shown in FIG. 18, an enlargement 58 can be provided for the sealing cylinder 48 in its upper part (in the Figure), so that it performs a simple interference with the vessel body.

As another alternative, not shown, in order to guarantee the seal between tap 1 and vessel, at least one, and preferably three threading sectors (as pointed out with reference 37 in document IT-A-TO2004A000749 of the same Applicant of the present invention) can be created, which are adapted to allow rotating the tap 1 around the vessel neck: such sectors are adapted to the type of threading which can be found on the neck itself, and, upon screwing, follow the threading itself, and therefore allow simulating the same screwing movement performed by a normal plug, for example till they snap on an undercut provided on the vessel neck. In this case, once having anchored the tap 1 to the vessel neck, there will be the feature of being able to go on rotating around the tap 1 screwing direction, and the threading sectors will again start following the thread till a sector "jumps" the vessel threading and then allows repeating the rotation, with nothing happening to the tap 1, since everything is already anchored on the vessel neck. In this way, the tap 1 can be oriented in the best position decided by the user.

As can be understood by the above mentioned examples, it is obvious that other shapes and geometries can be provided, which guarantee the perfect liquid seal between tap 1 and vessel, all these shapes and geometries falling within the scope of the present invention.

Figure 9:
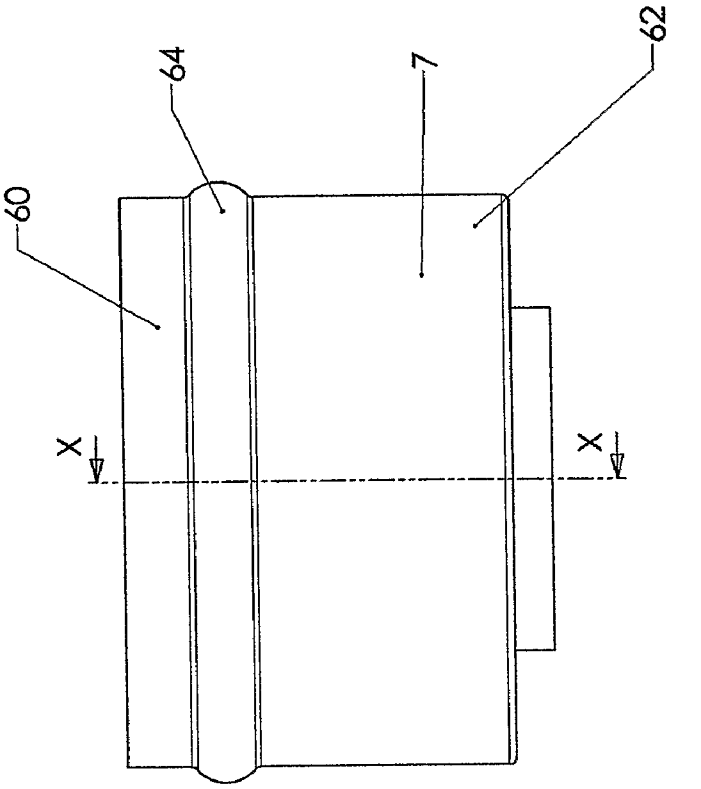
FIG. 9 is a front view of an embodiment of the closing and sealing valve member of the inventive tap.
Figure 10:
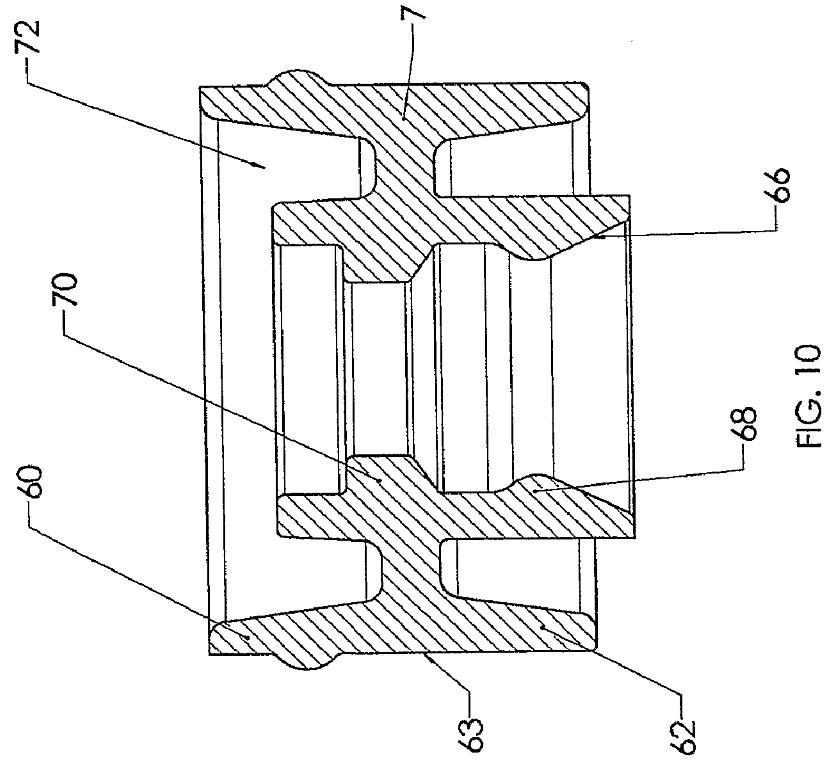
FIG. 10 is a sectional view performed along line X-X in FIG. 9.
Figure 11:
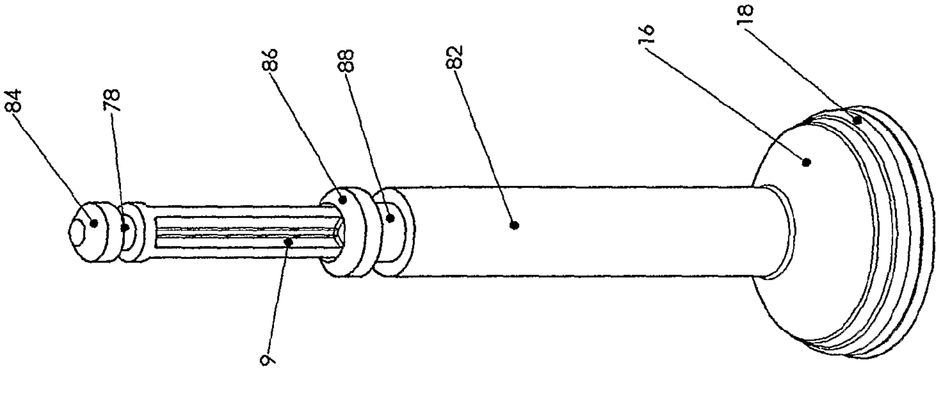
FIG. 11 is a perspective view of an embodiment of the stem of the inventive dispensing tap.
Figure 12:
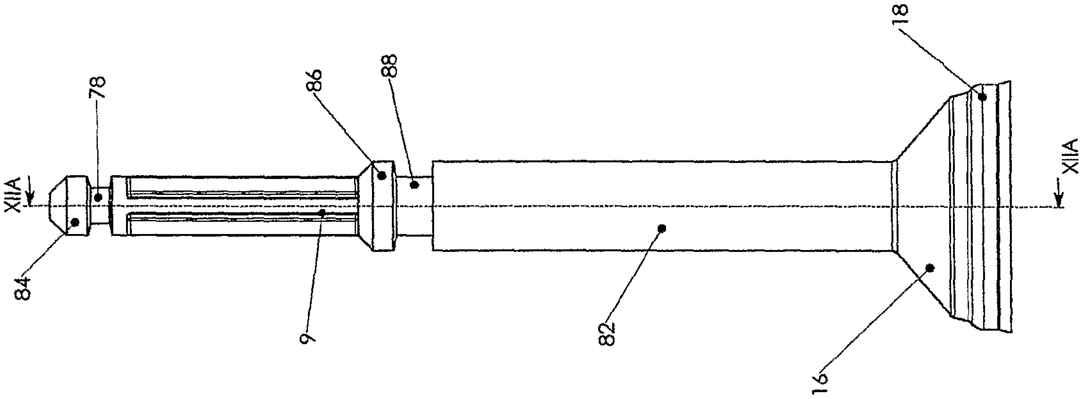
FIG. 12 is a front view of the stem in FIG. 11.
Figure 12A:
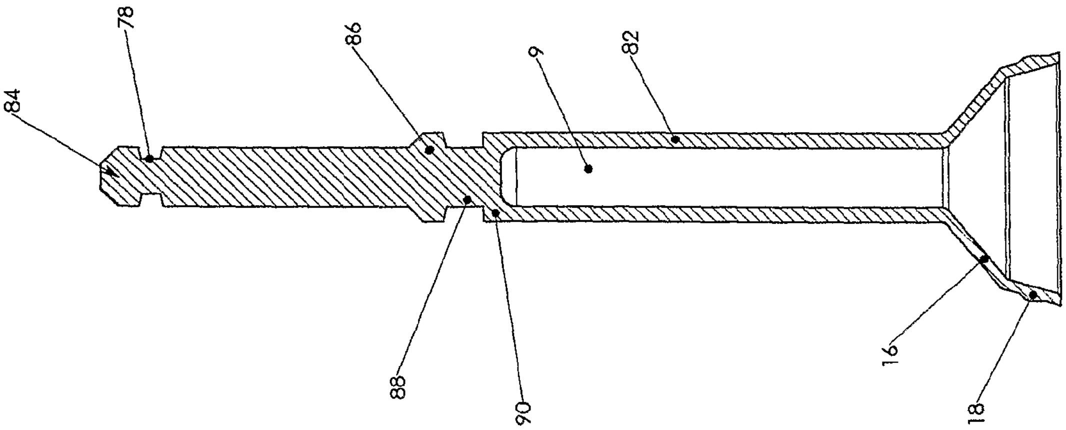
FIG. 12A is a sectional view performed along line XIIA-XIIA in FIG. 12.

As regards the internal valve 7, in the standard arrangement shown particularly in FIGS. 9 and 10, it is stamped in a semi-rigid material which allows simultaneously having the requirements of stiffness and flexibility in some of its points; also here, during the stamping step, a sliding agent can be added, which is then used to allow the piece to have less sliding friction in the body cylinder.

Particularly, the upper lip 60 is flexible, to compensate for possible non-axial movements of the stem 9 and to always provide the right "pull" in the sealing area.

The lower lip 62 is also flexible for compensating and dampening possible non-axial movements (it operates as guide being present on the stem, differently from other taps being present on the market, which have guides always on the body): such geometry operates as self-centring member for the stem 9 during its sliding, namely when opening and closing operations of the tap 1 are performed. The external area of the valve 7 has a self-lubricating hollow space 63 and a sealing area 64 (and therefore an air-liquid partitioning are), which, being always inserted in the liquid, never dries, as instead occurs in the previously proposed arrangements, and which cooperates with the body 3 in its cylindrical part 5.

The engagement area with the stem 9 has a starting chamfer 66 for centring on the stem 9, a sealing projection 68 on the stem 9 and a clamping projection 70 which allow clamping stem 9 and valve 7.

A safety trap 72 is finally provided, which is used for keeping possible material leaks.

As regards the upper spring member 11, which operates as return spring, various geometries are obviously provided, in addition to the dome-one shown. In the Figure, it can be noted that such member 11 is equipped with clamping means 74 of the stem 9, equipped with at least one clamping projection 76, which is adapted to engage a corresponding recess 78 obtained in the upper part of the stem 9; and the member 11 is further equipped with sealing means 80 on the body 3, composed of a special geometry adapted to engage a corresponding sealing recess 82 obtained outside the cylindrical part 5 of the body 3.

As regards the stem 9, it can also be made of various geometries and arrangements, in order to better suit it to applications. As shown in the non-limiting embodiments of FIGS. 11 to 12A, and 25 to 33, it is equipped with an elongated body 82, which ends at one end with a sealing tooth 84 with the upper member 11 and at the opposite end with the frustum-of-cone self-centring part 16 already shown, equipped with a smooth profile or with a ball-shaped sealing profile 18. Along the elongated body 82, a sealing seat with the valve 7 is provided, which is preferably composed of a tooth 86 and a recess 88, in addition to a liquid sealing area 90 which cooperates with the lower part of the valve 7.

Figure 28:
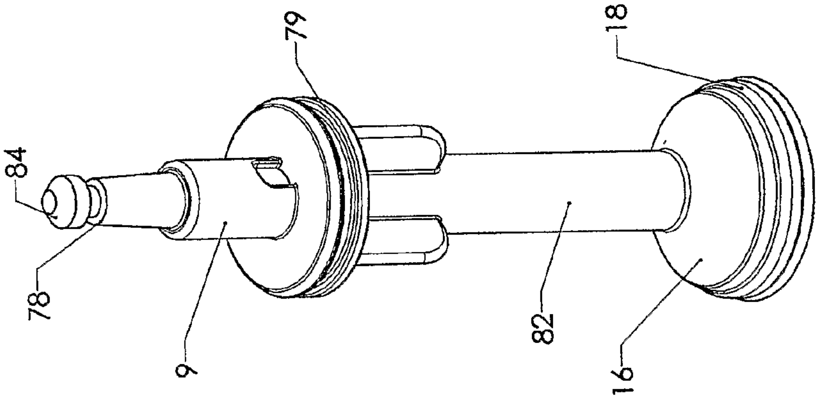
FIG. 28 is a perspective view of another variation of the inventive tap stem.
Figure 30:
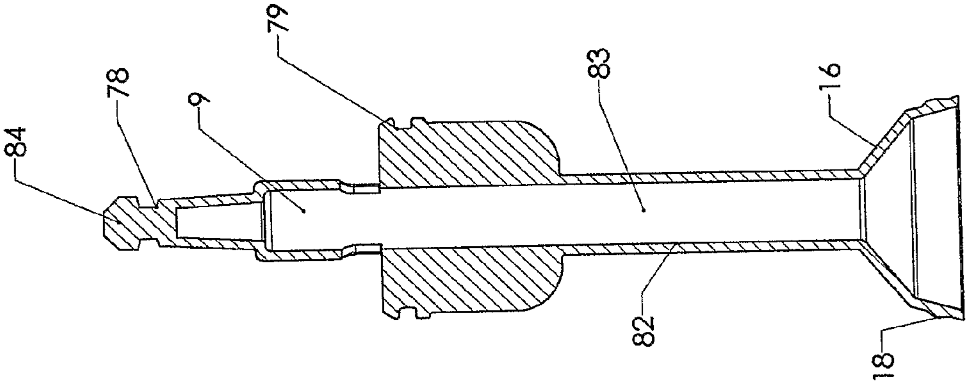
FIG. 30 is a sectional view performed along line XXX-XXX di FIG. 29.
Figure 29:
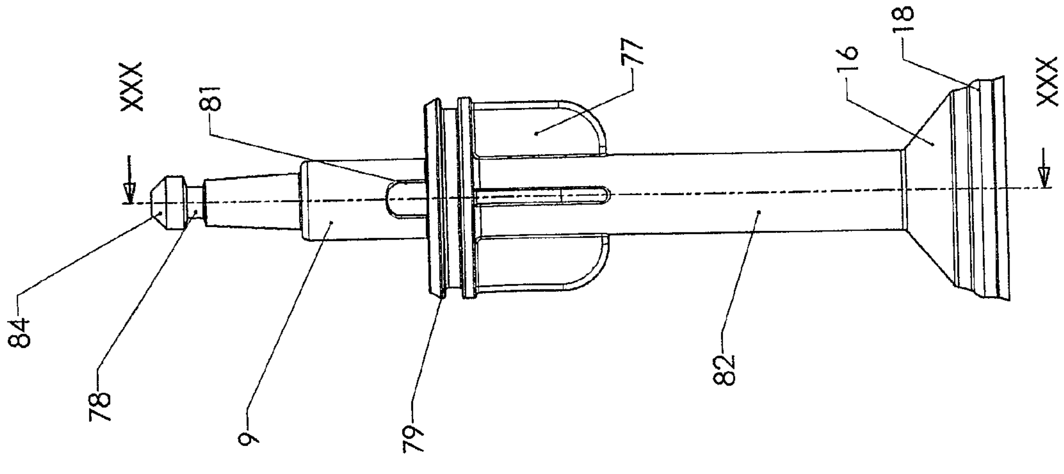
FIG. 29 is a front view of the stem in FIG. 28.

In particular, FIGS. 28 to 30 show a first variation of the stem 9 in which wings 77 are provided for centring the stem 9 in the cylindrical part 5 of the body 3, and moreover a seat 79 for a sealing O-ring. In this variation, a liquid discharge hole 81 is also present with a drain channel 83, which is coaxial with the cylinder 5 axis, in which such hole 81 performs a safety function in case of inconveniences when spilling the liquid.

Figure 31:
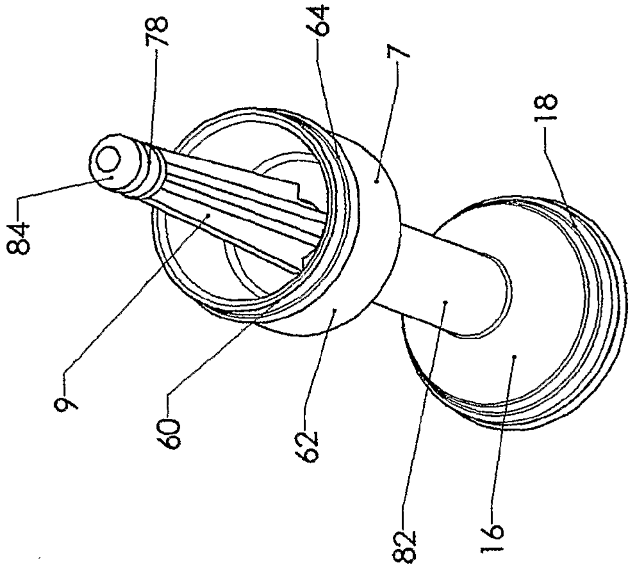
FIG. 31 is a perspective view of a further variation of the inventive tap stem.
Figure 33:
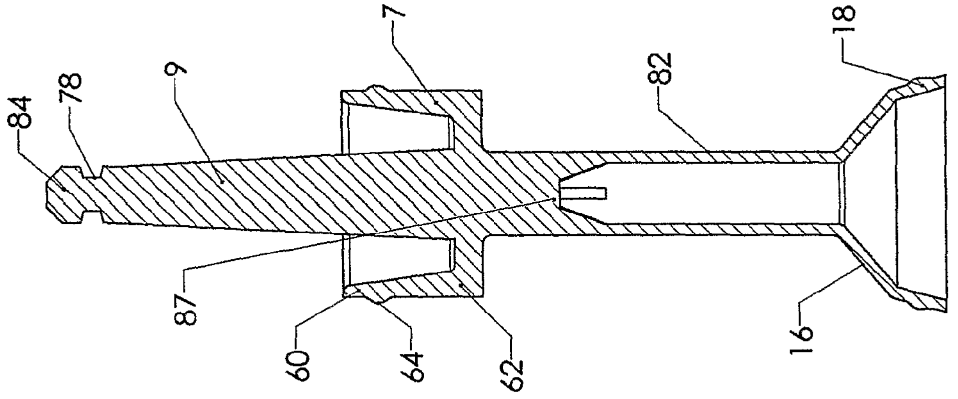
FIG. 33 is a sectional view performed along line XXXIII-XXXIII di FIG. 32.
Figure 32:
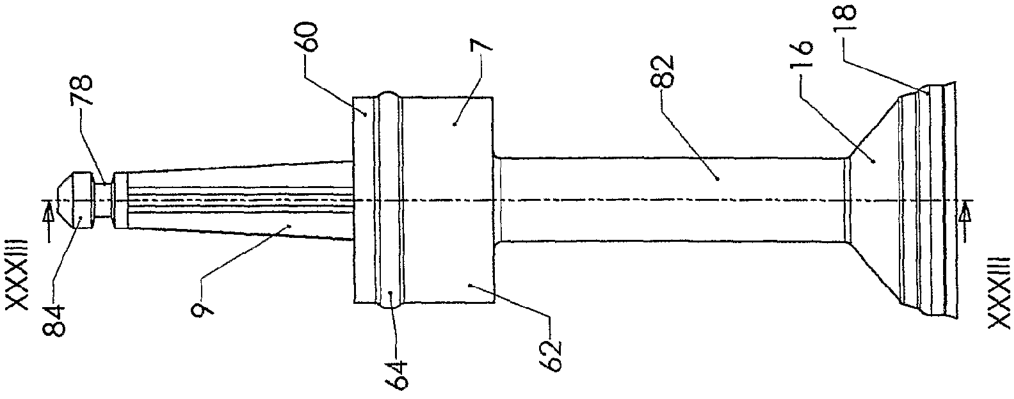
FIG. 32 is a front view of the stem in FIG. 31.
Figure 34:
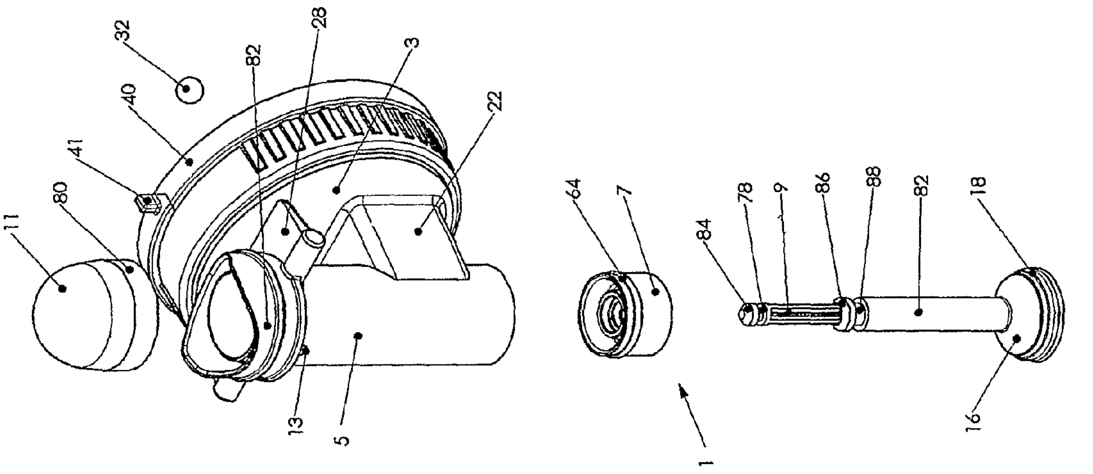
FIG. 34 is an exploded, summarising perspective view of the tap in FIG. 1.
Figure 35:
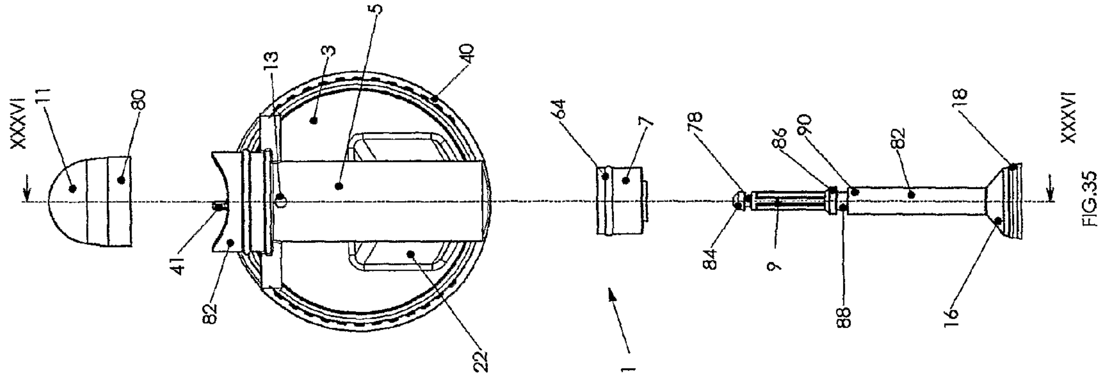
FIG. 35 is an exploded front view of the tap in FIG. 34.
Figure 36:
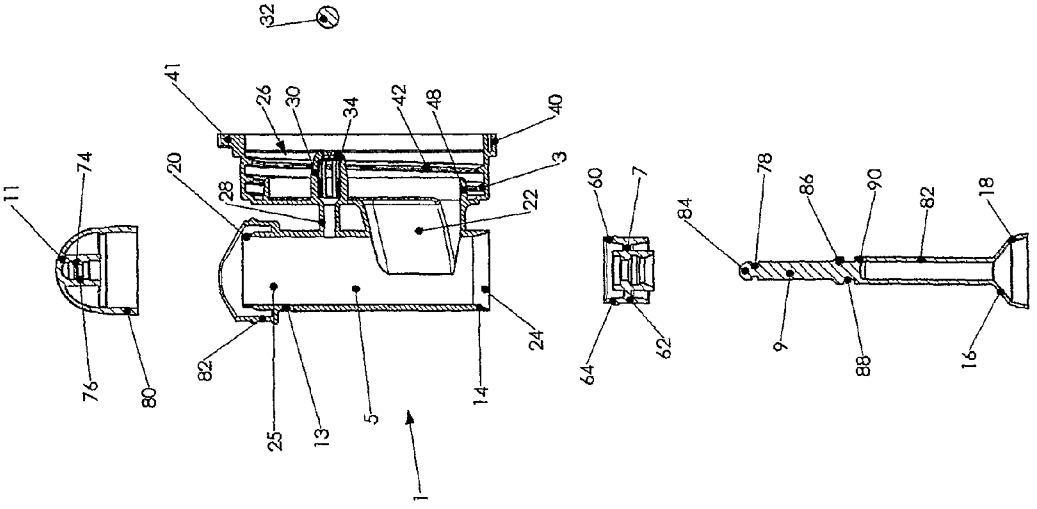
FIG. 36 is a sectional view performed along line XXXVI-XXXVI di FIG. 35.

Instead, FIGS. 31 to 33 show a second variation of the stem 9, this time made in a single piece with the valve 7, in order to have all characteristics of the standard tap 1, and namely flexible lip seal, guide on the stem and safety trap, and to add the improvements of the valve with O-ring, and namely the central discharge trap. In this variation, open holes 87 are provided which, due to the upper cross-shaped geometry, allow communicating the trap 72 with the safety discharge.

The inventive tap 1 can also be equipped with warranty seal means (not shown) with a known arrangement for this type of taps: such seal means guarantee the tap 1 and the vessel connected thereto from possible tampering. For such purpose, they prevent the operating actuation of the tap 1 when they are present, while, when they are removed (for example through a tear-type opening due to suitable projecting tongues which can be grasped by the user) allow activating the tap 1 and making it operate when opening and closing.

As regards the operating principle of the inventive tap 1, in order to fully understand it, together with the advantages, which can be provided with respect to known taps, it will be necessary to schematically analyse all its possible operating applications.

In case of a tap 1 applied on a rigid vessel without integrated air passage, A will designate the environment and B the packaging system (tap 1+vessel): consequently, pa will be the ambient pressure, and pb the pressure inside the vessel.

In this case, liquid would continue to go out of the rigid vessel B till pb≧pa, while its delivery would be stopped (or anyway would decrease till it stops, when the rigid walls will compensate the vacuum by creating a sort of equilibrium state) when inside the vessel vacuum will start, namely pb<pa.

In case of a tap 1 applied on a rigid vessel without integrated air passage, but without safety valve on the air passage, the air passage starts operating when vacuum starts inside the vessel: therefore, a case could happen in which the vessel is pressurised and therefore makes liquid go out of the air hole. For this reason, so far one was obliged to put the liquid outlet hole in correspondence with the air inlet hole; the same occurred if, when spilling, a pressure was created on the vessel. The inventive valve 26 solves such problem.

Summarising, the inventive tap 1 is able to solve all above mentioned problems, and above all is the only tap which is able to be connected to a connection system (which makes it remain open for large distributions) due to the help of the non-return valve 26.

When the tap is closed, there will be an upper area of the plug in which only air will be present, and the chamber will have a pressure equal to the external environment pressure, namely pa, due to the front venting hole 13 of the tap 1.

The lower part of the tap 1, and naturally all the part of the tap 1 which is connected to the vessel, will be immersed in the liquid: the upper part and the lower part will be kept divided due to the sealing action performed by the internal valve 7 (which is connected to the stem 9) on the internal geometry of the front cylinder 5 of the body 3.

The stem 9 in turn will be connected to the upper member 11, which will provide it with a certain pull and will keep it coupled with the body 3, avoiding liquid to go out.

A further characteristic of the inventive tap 1 is that the whole air intake duct 28 (which is not directly connected to the outside but has an intermediate chamber 25), when the tap 1 is in a closing position, is completely immersed into the liquid.

This condition makes the contained liquid impossible to be dried, and therefore the air duct is always "clean", and the internal ball valve is always well lubricated, upon its use, and above, especially when liquids of the oil or detergent types are used, a situation occurs in which the non-return valve 26 and the internal sealing valve 7 always remain lubricated.

When the tap 1 starts opening (FIGS. 4 and 5), immediately the liquid duct 22, 24 opens, while the air duct 28, due to the above described height X, will remain closed: then, immediately a liquid outlet prevalence will start being created and simultaneously a vacuum will start being created inside the vessel.

Figure 6:
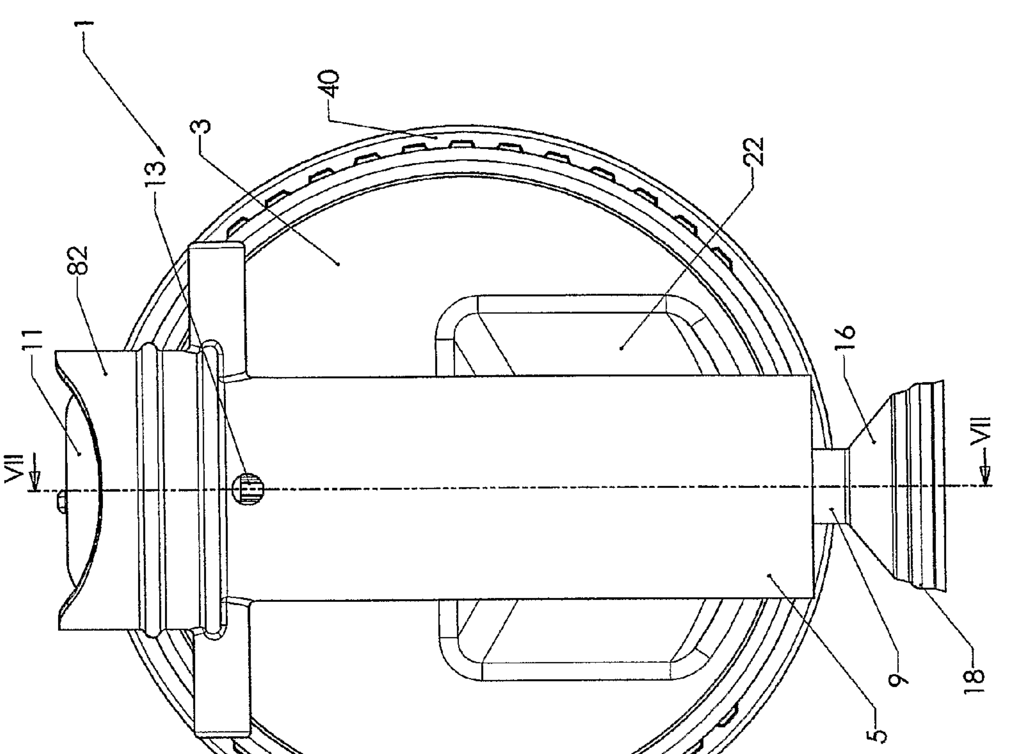
FIG. 6 is a front view of the tap in FIG. 1 in a complete opening position.
Figure 7:
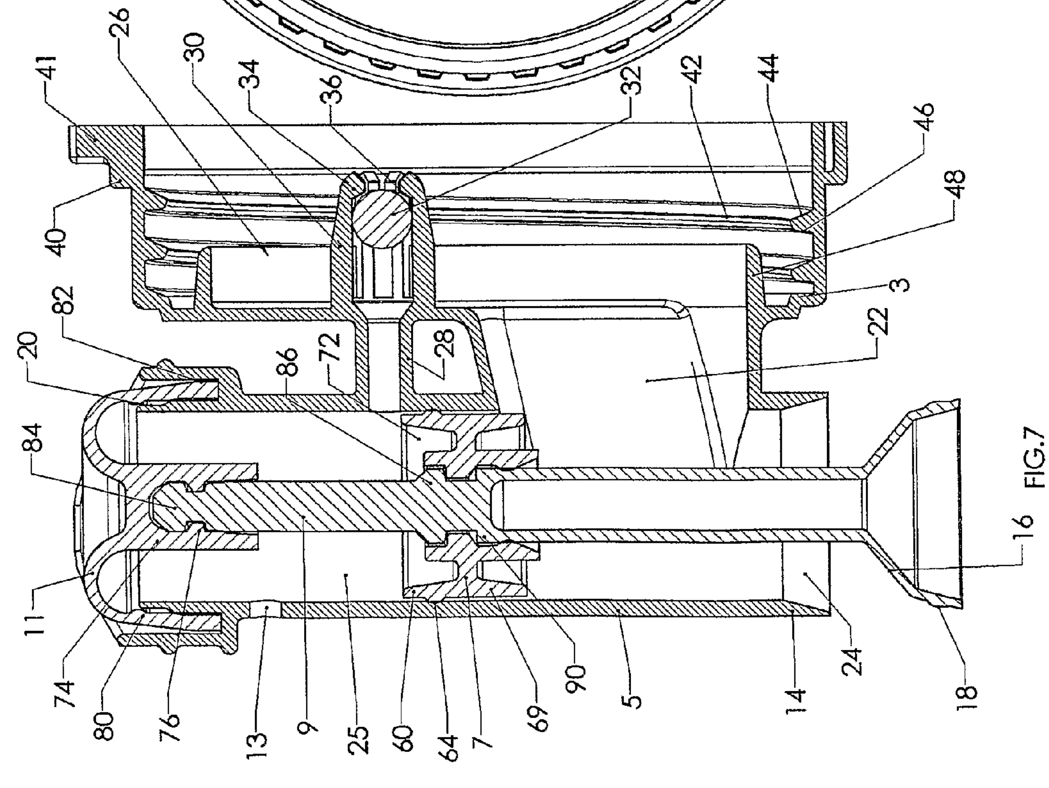
FIG. 7 is a sectional view performed along line VII-VII in FIG. 6.
Figure 8:
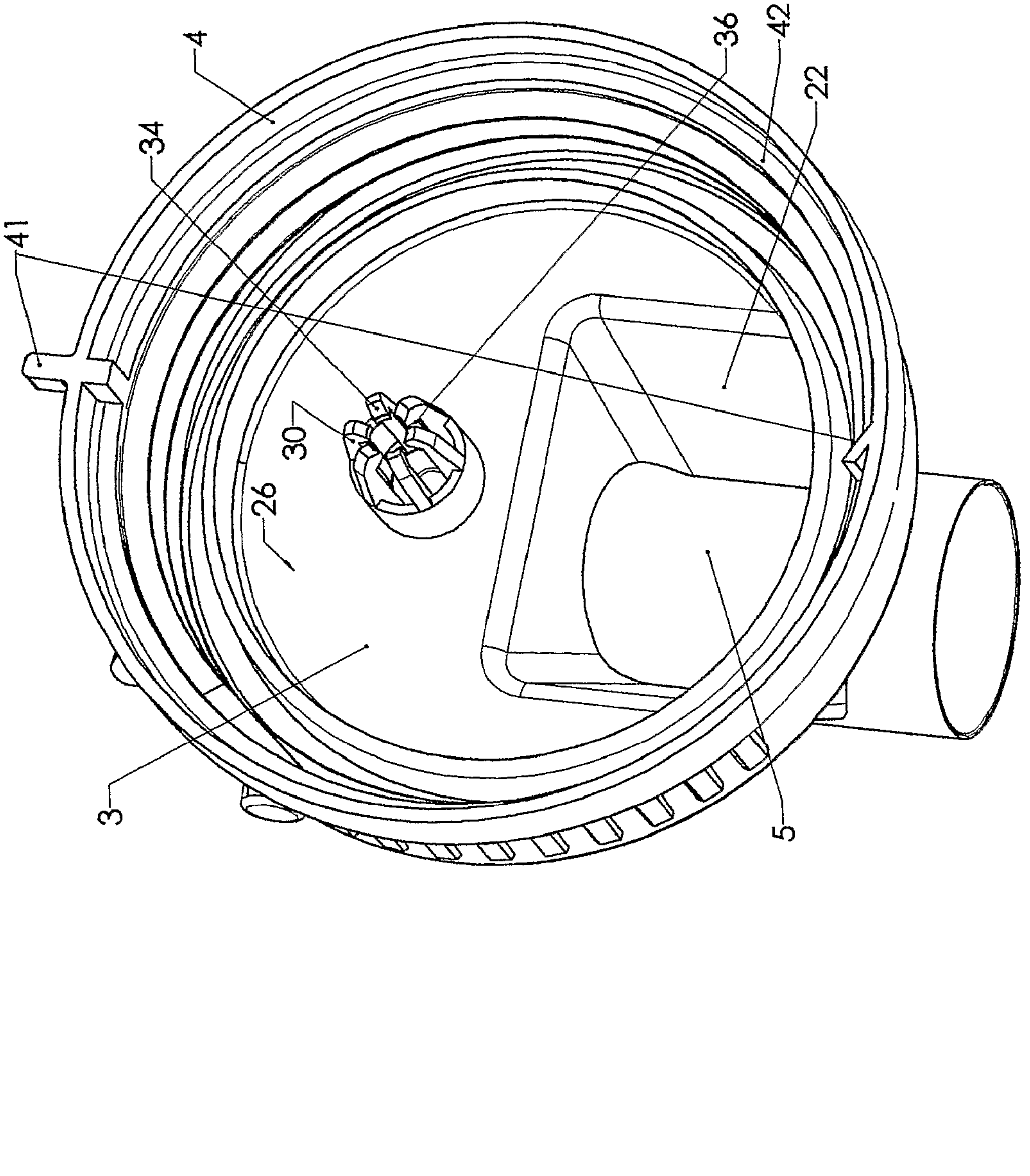
FIG. 8 is a perspective rear view of the tap in FIG. 1.

Now, as can be seen in FIGS. 6 and 7, going on with the opening stroke, at the end also the air duct 28 will be opened, which immediately will start sucking, due to the vacuum created by the previous action, pulling air inside the vessel (and therefore immediately cleaning the air duct 28 and making the very light-weight and sensitive ball 32 go back), to try and compensate the pressure difference being created between outside and inside the vessel.

The safety valve 26 will act, for example, in case of a sudden pressure on the vessel, by immediately closing the air duct. It can then be noted that the non-return valve 26 is autonomously managed, due to acting pressures and pressure differences.

When the tap 1 will close, first of all the air duct 28 will close, thereby avoiding possible liquid leaks, and then the liquid duct 22, 24 will close (which always has a greater prevalence also due to its geometric arrangement).

In case, when spilling, part of the liquid goes out, there is, in the internal valve 7, the trap 72, which operates as accumulation tank, thereby providing further warranties of a correct operation, or better still in case of a stem with central discharge as shown in FIG. 33.

The present invention has been shown with reference to some preferred, but not limiting, embodiments: it will be immediately obvious to a skilled person in the art that numerous variations and modifications can be made thereto, which all fall within the scope of the invention as specified in the enclosed claims. For example, the sealing cage-ball-sealing cone assembly can be manufactured as separate object, which can be used also in other taps or applications, which need a valve system which is sensitive to pressure changes.

Figure 37:
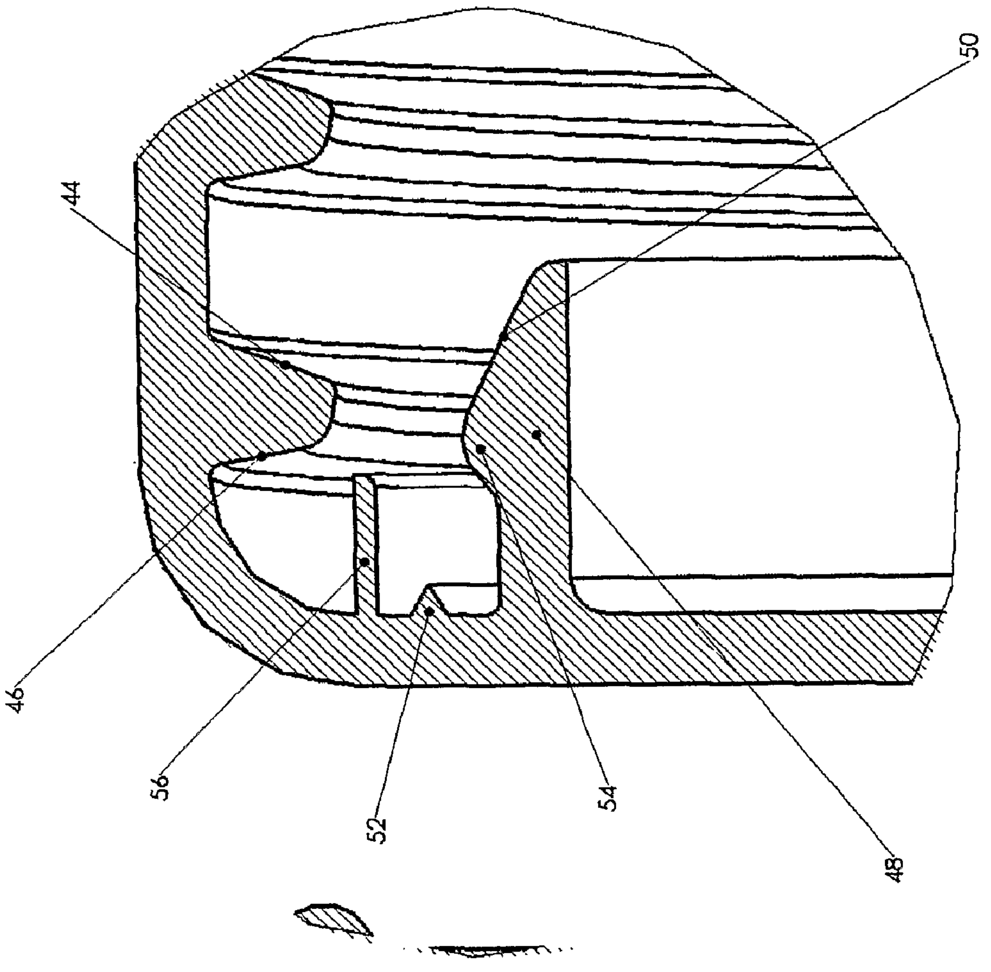
FIG. 37 is a detailed view of the inventive tap, which shows another variation, with triple connection, of the connecting part to a vessel.

Moreover, as shown in FIG. 37, it is possible to realise different sealing combinations between internal sealing cylinder 48, projection 52 and small lip 56: FIG. 37 shows the one in which all three members are present, for realising a triple seal. All other combinations adapted to realise double seals are obviously possible.

Figure 38:
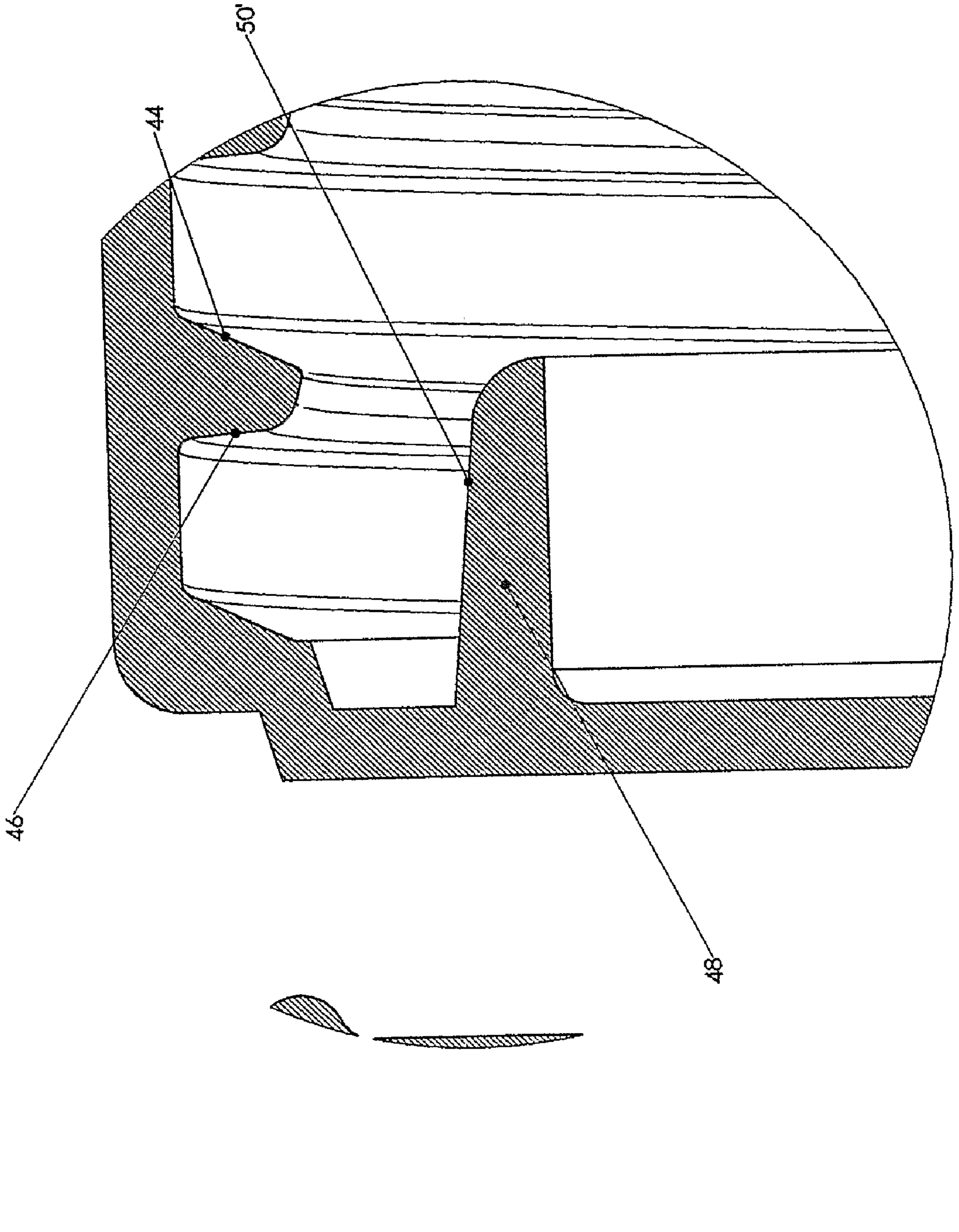
FIG. 38 is a detailed view of a variation of the sealing profile with vessel opening.

As shown in FIG. 38, moreover, it is possible to realise the sealing profile of the sealing cylinder 48 as designated with 50', namely two conical profiles which perform a double, external and internal seal on the vessel neck, in its upper area: the neck realises an interference inside and tends to flex, but finds a small cone on the outside which contains its dilatation and performs a double seal. Also in this case, it will be possible to realise a triple or higher seal by adding other members, such as the above projection 52 and small lip 56, where the small lip 56 is the main seal.

Figure 39:
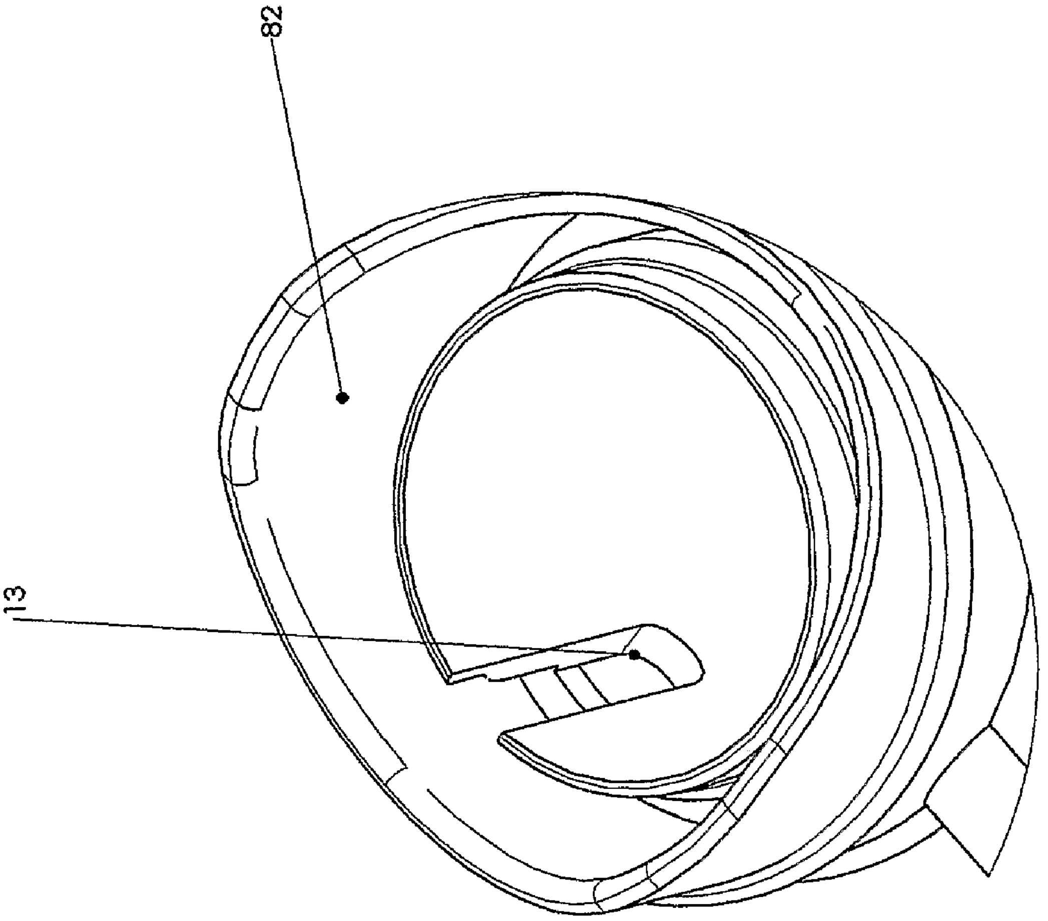
FIG. 39 shows a variation of an embodiment of the inventive tap head, pointing out a variation from the top, instead of on the front, of the air inlet hole.

Moreover, it is possible, as shown in FIG. 39, that the air inlet hole 13 is obtained through a stamping process with crossed male dies: the same process allows obtaining a rounded profile on the body, without necessarily having to realise the small lip, which must therefore be riveted for inserting the internal valve without damaging it. It is also possible to anyway obtain the small lip also with this variation.

Figure 41:
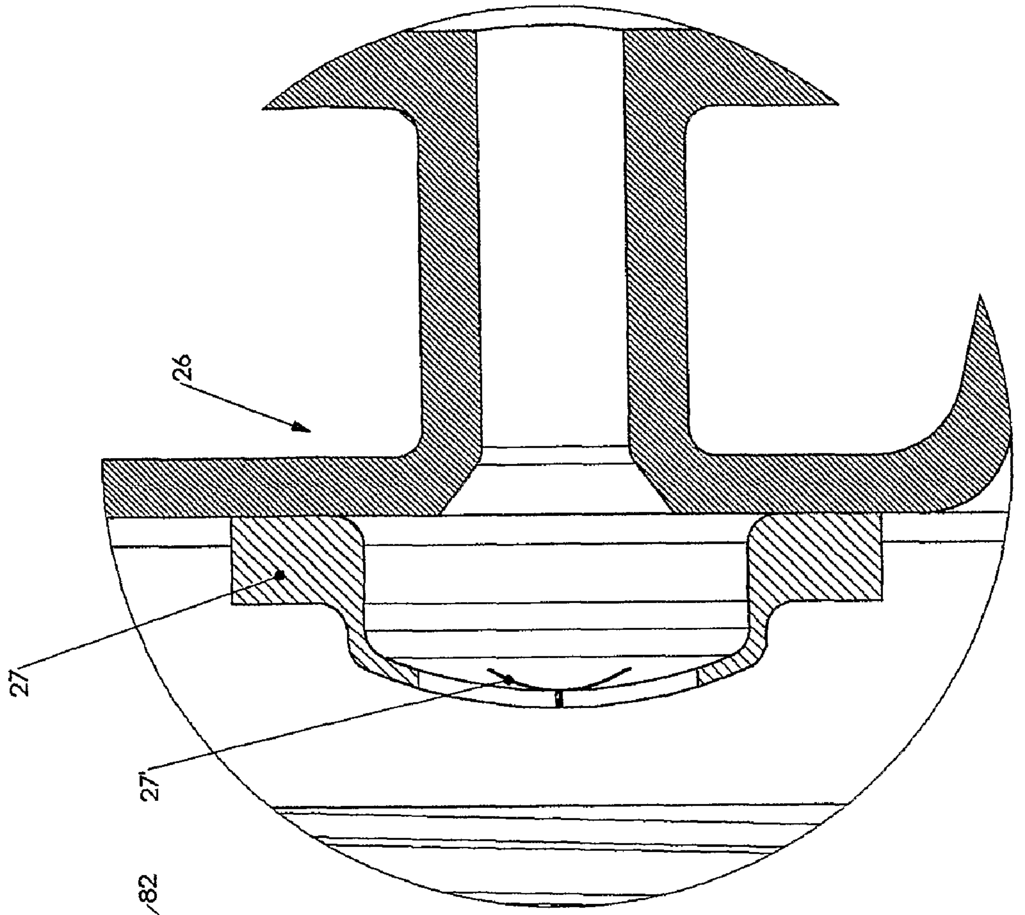
FIG. 41 is a detailed view of the valve in FIG. 40.
Figure 40:
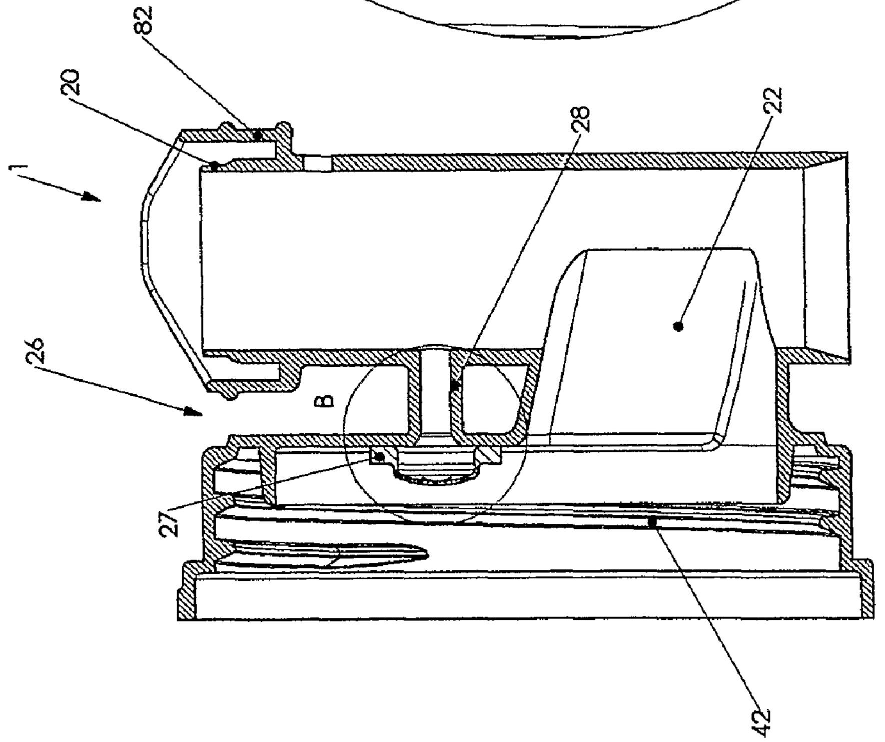
FIG. 40 shows a side sectional view of a variation of the inventive non-return valve.
Figure 42:
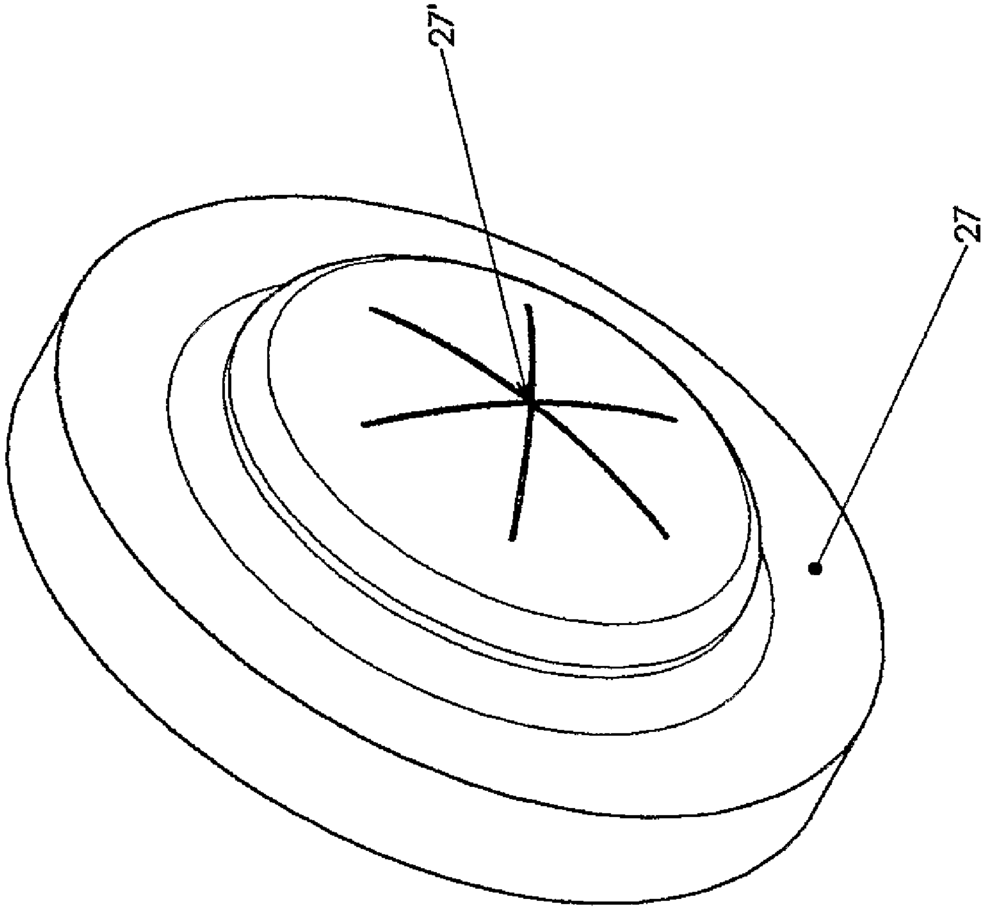
FIG. 42 is a perspective view of the valve in FIG. 40.

Moreover, as shown in FIG. 40 to 42, it is possible to make the non-return valve 26 shaped as a button 27 with star-type opening 27': such valve 27 is made of silicone, which is the only material which provides the chance of cutting the piece after stamping, namely of creating the star 27' edges so that they accurately seal one against the other. The valve 27 can be ultrasound, hot or laser welded; in addition, it will be possible to restrain it, by creating a restraint geometry on the body or by adding another piece for restraining.

Figure 44:
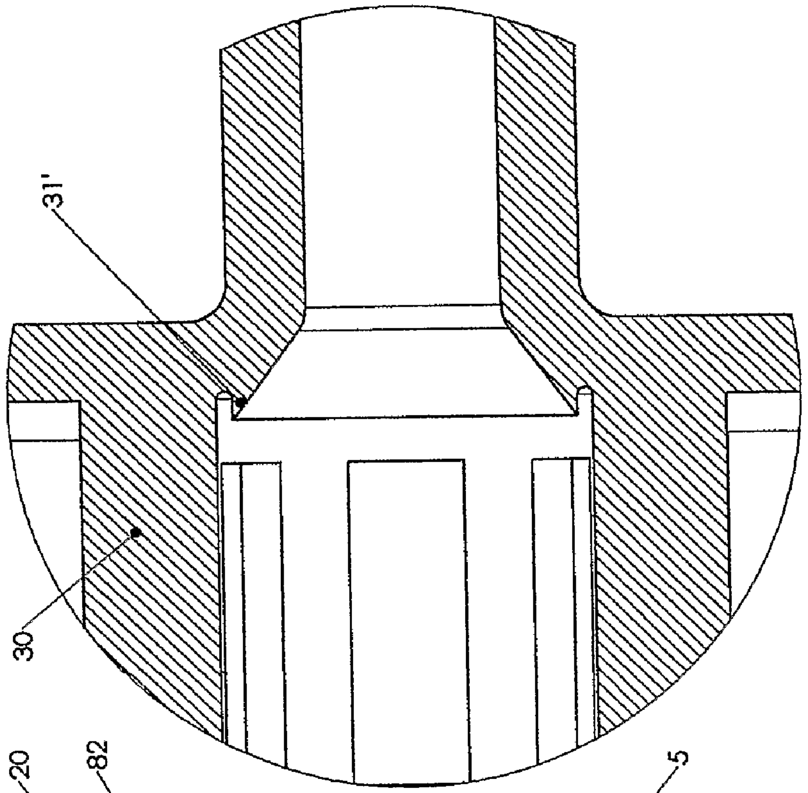
FIG. 44 is a detailed view of the valve in FIG. 43.
Figure 43:
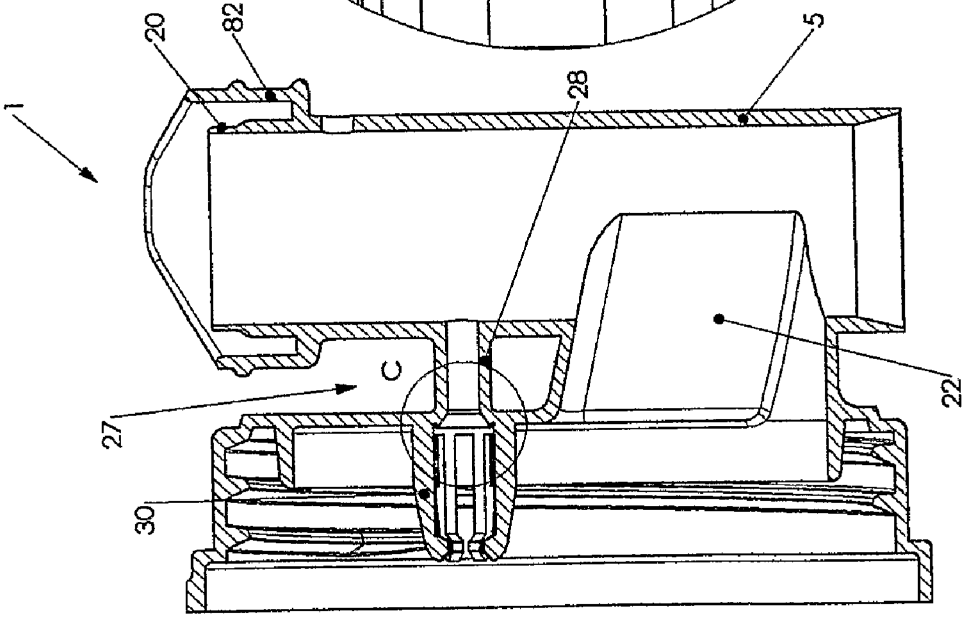
FIG. 43 shows a side sectional view of another variation of the inventive non-return valve with a small lip.
Figure 45:
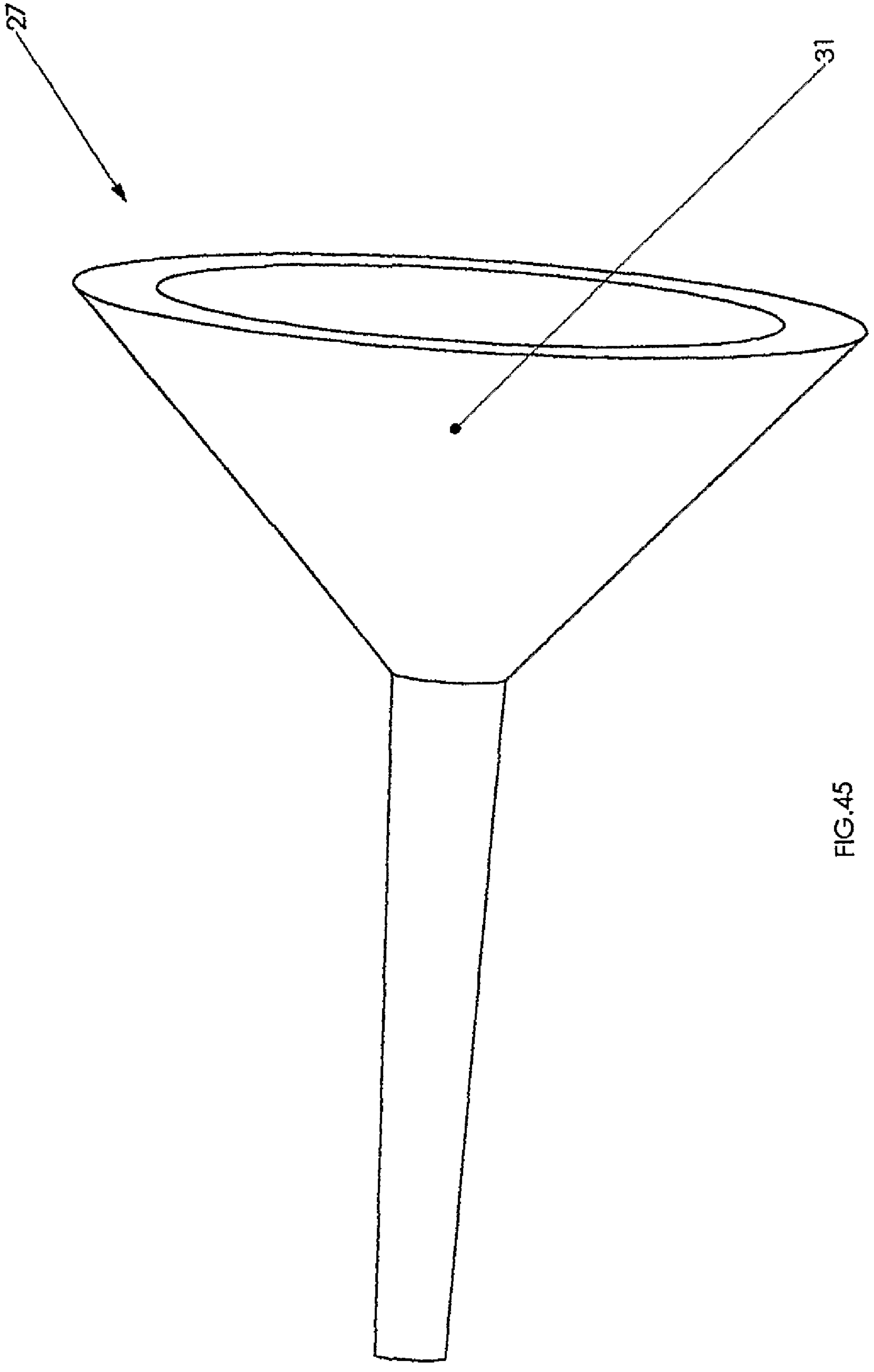
FIG. 45 is a perspective view of the valve in FIG. 43.

Finally, as shown in FIG. 43 to 45, it is possible to realise the non-return valve 27 with a "funnel" or "mushroom" geometry 31 or with a "small lip": in this case, in addition to providing an adequate seat for the valve 31, it is possible to provide such seat with a small lip profile 31' next to the sealing cone, in order to solve the problem of shrinkage of the area in which the small teeth 30 are attached. Obviously, as regards the geometry 31, modifications (not shown) will have to be performed on the body, or a piece (not shown) will have to be added to provide an end-of-stroke to the mushroom geometry.

The invention claimed is:

1. A tap for delivering liquid comprising:

a body equipped with:

a connection part adapted and configured for coupling to a vessel of liquid to be delivered and a liquid delivering passage;

stem means adapted to open and close the liquid delivering passage; and elastic actuating means adapted to actuate the stem means in their delivery opening and closing positions;

wherein the tap further comprises:

air inlet means positioned on the body;

air outlet means adjacent to the inside of the vessel;

a sealing valve adapted to open and close an air passage between the air inlet means and the air outlet means; and a non-return valve placed in the body between the air outlet means and a vessel interior, the non-return valve comprising a plurality of teeth integral to and extending from the body, the plurality of teeth substantially surrounding and adjacent to a cone-shaped sealing geometry, and a ball received within a cage defined by the plurality of teeth, the ball being adapted to be guided and driven by a pressure difference between outside the tap and inside the vessel;

wherein the stem means are equipped with an elongated body that terminates at one end with a sealing tooth coupled with the elastic actuating means and at an opposite end with a self-centering frustum-of-cone part, the elongated body being equipped with a sealing seat comprising a tooth, a recess, and a liquid sealing area that cooperates with the sealing valve; and wherein the stem means are further equipped with:

wings for centering the stem means in the cylinder of the body;

a seat for a sealing O-ring; and a liquid discharge hole with a drain channel that is coaxial with a vertical axis of the cylinder.

2. A tap of claim 1, wherein the body is made in a single piece made of plastic material and further comprises a front cylinder in which the sealing valve slides, the sealing valve being operatively coupled with the stem means, the stem means being operatively coupled with the elastic actuating means.

3. A tap of claim 1, wherein a lower part of the body is internally shaped with a profile, preferably with a slanted wall, the lower part of the body being adapted to be coupled to facilitate a liquid seal with the self-centering frustum-of-cone geometry.

4. A tap of claim 3, wherein an external surface of the lower part of the stem means is smooth and is adapted to seal with a circular protuberance formed on an internal surface of the lower part of the body.

5. A tap of claim 3, wherein the lower part of the body is internally equipped with a small lip adapted to be sealingly coupled with the external smooth surface of the lower part of the stem means.

6. A tap of claim 3, wherein the lower part of the body is internally smooth and is adapted to be sealingly coupled with a concentric protuberance formed on an external surface of the lower part of the stem means.

7. A tap of claim 2, wherein the cylinder for sliding the sealing valve is equipped with a small lip in its upper part, namely in its part adapted to receive by restraint the elastic actuating member, the small lip being adapted to be bent, mechanically or on a die, in order to create a starting point for assembling the sealing valve.

8. A tap of claim 1, wherein the cylinder for sliding the sealing valve is adapted to be operatively connected to the elastic actuating means through stamping.

9. A tap of claim 1, wherein a cross section of the liquid delivering passage is much greater that a cross section of the air inlet and outlet means, the passage being equipped with downward slanted walls adapted to facilitate conveying and delivering of the liquid.

10. A tap of claim 2, wherein the air inlet and outlet means are composed of an air inlet/outlet hole on the front cylinder of the body, an air chamber in the front cylinder of the body, and an air duct adapted to connect the front cylinder to the vessel interior.

11. A tap of claim 10, wherein a distance X between an axis of the hole and an axis of the duct is adapted to delay opening of the air hole with respect to the liquid delivering passage in order to create a liquid prevalence and a vacuum inside the vessel, the vacuum being adapted to actuate the non-return valve.

12. A tap of claim 10, wherein the air inlet/outlet hole is formed through a stamping process with crossed male dies.

13. A tap of claim 1, wherein the teeth have a chamfered end as a starting point adapted to facilitate an insertion of the ball inside the teeth, the teeth being then adapted to allow moving the ball inside between an opening and a closing position.

14. A tap of claim 13, wherein the chamfered end is further equipped with a stop edge adapted to retain the ball after insertion.

15. A tap of claim 1, wherein the teeth are made of elastic material in order to insert the ball therein when manufacturing of the non-return valve is complete.

16. A tap of claim 1, wherein the teeth are made as straight teeth and are adapted to be hot riveted or mechanically bent after having receiving the ball therein.

17. A tap of claim 1, wherein the teeth of the non-return valve are placed in a slanted position with respect to an axis of the connection part, the non-return valve, in its rest position, being adapted to always have the ball in a closing position against the cone-shaped sealing geometry obtained on the body.

18. A tap of claim 1, wherein the body is equipped with a part adapted to come in contact with the liquid vessel and form a perfect seal with the vessel, the part being equipped with at least one reference member.

19. A tap of claim 18, wherein the part is equipped with a threading composed of a thread with a support of two geometries adapted to cooperate with other geometries being present on the vessel.

20. A tap of claim 18, wherein the part is equipped with an internal sealing cylinder equipped with a starting surface, the sealing cylinder also cooperating with at least one triangular concentric projection, the cylinder being adapted to engage a vessel neck.

21. A tap of claim 18, wherein the part is equipped with an internal sealing cylinder equipped with a sealing protuberance, the protuberance being adapted to be geometrically conformed in order to be flexed in contact with a vessel neck and to be automatically adapted to vessels with different sizes.

22. A tap of claim 21, wherein the part is further equipped with a thin small lip, the small lip being adapted to be fitted outside the vessel neck, increasing the seal.

23. A tap of claim 18, wherein the part is equipped with an internal sealing cylinder, the sealing cylinder being equipped with an enlarged diameter in its upper part.

24. A tap of claim 18, wherein the part is equipped with at least one, and preferably three threading sectors, adapted to allow the tap to rotate around a vessel neck and to be operatively engaged with a vessel neck once having reached a desired operating position.

25. A tap of claim 18, wherein the part is equipped with an internal sealing cylinder, at least one tooth-shaped sealing projection and at least one sealing small lip, each one of the members being present in combination with another one or the three members being simultaneously present.

26. A tap of claim 18, wherein the part is equipped with a sealing cylinder with a profile obtained through two cone-shaped profiles, adapted to perform a double, external and internal seal on the neck of the vessel.

27. A tap of claim 1, wherein a seat of the non-return valve has a geometry shaped as a "funnel-" or a "mushroom-".

28. A tap of claim 27, wherein the non-return valve is further equipped with a lip profile surrounding the cone-shaped sealing profile.

29. A tap of claim 1, wherein the sealing valve is equipped with an upper flexible lip adapted to compensate for nonaxial movements of the stem means.

30. A tap of claim 1, wherein the sealing valve is equipped with a lower flexible lip, adapted to compensate and dampen nonaxial movements, the lower lip operating as self-centering member for the stem means during their sliding.

31. A tap of claim 1, wherein an external area of the sealing valve is equipped with a self-lubricating hollow space and a sealing area adapted to cooperate with the body in its cylindrical part.

32. A tap of claim 1, wherein the sealing valve is equipped with a starting chamfer in an engagement area with the stem means for centering on the stem means, with a sealing projection on the stem means and with a clamping projection adapted to allow clamping between stem means and valve.

33. A tap of claim 1, wherein the sealing valve is equipped with a safety trap adapted to keep collect possible material leaks.

34. A tap of claim 1, wherein the elastic actuating means are equipped with clamping means with the stem means, equipped with at least one clamping projection which is adapted to engage a corresponding recess obtained in an upper part of the stem means, the elastic actuating means being further equipped with sealing means on the body, the sealing means being composed of a geometry adapted to engage a corresponding sealing recess obtained outside the cylinder of the body.

35. A tap for delivering liquid, comprising:

a body equipped with:

a connection part adapted and configured for coupling to a vessel of liquid to be delivered; and a liquid delivering passage;

stem means adapted to open and close the liquid delivering passage; and elastic actuating means adapted to actuate the stem means in their delivery opening and closing positions;

wherein the tap further comprises:

air inlet means positioned on the body;

air outlet means adjacent to the inside of the vessel;

a sealing valve adapted to open and close an air passage between the air inlet means and the air outlet means; and a non-return valve placed in the body between the air outlet means and a vessel interior, the non-return valve comprising a plurality of teeth integral to and extending from the body, the plurality of teeth substantially surrounding and adjacent to a cone-shaped sealing geometry, and a ball received within a cage defined by the plurality of teeth, the ball being adapted to be guided and driven by a pressure difference between outside the tap and inside the vessel;

wherein the stem means are made in a single piece with the sealing valve, the stem means being equipped with open holes adapted to facilitate fluid communication of the trap with a safety discharge.

36. The tap of claim 1, wherein the liquid is a selected from the group consisting of: high-density liquids and medium-density liquids.

37. The tap of claim 35, wherein the liquid is a selected from the group consisting of: high-density liquids and medium-density liquids.

* * * * *